United States Patent
Ko et al.

(10) Patent No.: US 10,863,430 B2
(45) Date of Patent: Dec. 8, 2020

(54) METHOD AND DEVICE FOR CONNECTING SINGLE AP DEVICE AMONG MULTIPLE AP DEVICES ON SAME NETWORK TO TERMINAL

(71) Applicant: SAMSUNG ELECTRONICS CO., LTD., Gyeonggi-do (KR)

(72) Inventors: Hyeon-mok Ko, Hwaseong-si (KR); Dae-hyung Kwon, Seoul (KR); Duk-gu Sung, Seoul (KR); Chang-hyun Kim, Seoul (KR); Kang-jin Yoon, Seoul (KR); Chang-Hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 16/425,148

(22) Filed: May 29, 2019

(65) Prior Publication Data
US 2019/0281544 A1    Sep. 12, 2019

Related U.S. Application Data

(63) Continuation of application No. 14/909,344, filed as application No. PCT/KR2014/007034 on Jul. 31, 2014, now Pat. No. 10,321,393.

(30) Foreign Application Priority Data

Jul. 31, 2013 (KR) ........................ 10-2013-0091172

(51) Int. Cl.
*H04W 48/20* (2009.01)
*H04W 76/10* (2018.01)
(Continued)

(52) U.S. Cl.
CPC ......... *H04W 48/20* (2013.01); *H04L 61/6022* (2013.01); *H04L 63/00* (2013.01);
(Continued)

(58) Field of Classification Search
None
See application file for complete search history.

(56) References Cited

U.S. PATENT DOCUMENTS 7,668,123 B1 *   2/2010  Scott ..................... H04W 64/00
                                                        370/310
2002/0164952 A1  11/2002 Singhal et al.
(Continued)

FOREIGN PATENT DOCUMENTS

EP         1562323 A2      8/2005
KR    1020040046006 A      6/2004
(Continued)

OTHER PUBLICATIONS

Anonymous, "WiFi Access Points with Same Name", Nov. 2008, TechSpot Forums, XP055347314, 8 pages total, http://www.techspot.com/community/topics/wifi-accesss-points-with-same-name.115043/.
(Continued)

*Primary Examiner* — Chi H Pham
*Assistant Examiner* — Vladislav Y Agureyev
(74) *Attorney, Agent, or Firm* — Sughrue Mion, PLLC

(57) ABSTRACT

A method of connecting an access point (AP) device is provided. The method includes receiving media access control (MAC) address information of a terminal from the terminal through an external device, registering the received MAC address information, and determining whether the registered MAC address information corresponding to MAC address information registered to another AP device. In response to the registered MAC address information corresponding to the MAC address information registered to the
(Continued)

other AP device, an AP device managing the registered MAC address information is determined among the AP device and the other AP device. A connection request is received from the terminal, and the terminal is connected to the AP device based on whether MAC address information of the connection request is corresponding to the registered MAC address information.

20 Claims, 23 Drawing Sheets

(51) Int. Cl.
*H04W 4/80* (2018.01)
*H04L 29/06* (2006.01)
*H04W 12/08* (2009.01)
*H04L 29/12* (2006.01)
*H04W 48/16* (2009.01)
*H04W 84/12* (2009.01)
*H04W 76/18* (2018.01)
*H04W 12/00* (2009.01)

(52) U.S. Cl.
CPC ............ *H04L 63/101* (2013.01); *H04W 4/80* (2018.02); *H04W 12/08* (2013.01); *H04W 76/10* (2018.02); *H04W 12/00522* (2019.01); *H04W 48/16* (2013.01); *H04W 76/18* (2018.02); *H04W 84/12* (2013.01)

(56) References Cited

U.S. PATENT DOCUMENTS

| | | | |
|---|---|---|---|
| 2005/0160138 A1 | 7/2005 | Ishidoshiro | |
| 2005/0273607 A1 | 12/2005 | Yamana et al. | |
| 2006/0045272 A1* | 3/2006 | Ohaka | H04W 12/08 380/270 |
| 2006/0171388 A1* | 8/2006 | Ikeda | H04W 8/005 370/389 |
| 2006/0256741 A1* | 11/2006 | Nozaki | H04L 45/00 370/278 |
| 2007/0268908 A1* | 11/2007 | Linkola | H04W 12/08 370/395.2 |
| 2008/0090575 A1* | 4/2008 | Barak | H04W 28/18 455/444 |
| 2008/0109654 A1 | 5/2008 | Hardacker et al. | |
| 2008/0151815 A1* | 6/2008 | Bedekar | H04W 8/06 370/328 |
| 2008/0225770 A1* | 9/2008 | Cho | H04W 76/15 370/312 |
| 2008/0293420 A1 | 11/2008 | Jang et al. | |
| 2010/0232409 A1 | 9/2010 | Km et al. | |
| 2010/0293250 A1 | 11/2010 | Ankaiah et al. | |
| 2011/0164596 A1* | 7/2011 | Montemurro | H04W 76/11 370/338 |
| 2012/0014299 A1 | 1/2012 | Yoon et al. | |
| 2012/0036557 A1 | 2/2012 | Li | |
| 2012/0167175 A1 | 6/2012 | Choi | |
| 2012/0295635 A1* | 11/2012 | Yokota | H04W 64/006 455/456.1 |
| 2013/0043306 A1 | 2/2013 | Acosta-Cazaubon et al. | |
| 2013/0044733 A1 | 2/2013 | Jang | |
| 2013/0155965 A1 | 6/2013 | Koodli | |
| 2013/0223279 A1 | 8/2013 | Tinnakornsrisuphap et al. | |
| 2013/0250803 A1 | 9/2013 | Abraham et al. | |
| 2013/0283341 A1 | 10/2013 | Park et al. | |
| 2013/0290336 A1 | 10/2013 | Moriguchi et al. | |
| 2013/0304789 A1* | 11/2013 | Herlein | H04L 67/10 709/201 |
| 2013/0318249 A1 | 11/2013 | McDonough et al. | |
| 2014/0089143 A1 | 3/2014 | Dione | |
| 2015/0296447 A1 | 10/2015 | Luo et al. | |

FOREIGN PATENT DOCUMENTS

| | | |
|---|---|---|
| KR | 1020060079516 A | 7/2006 |
| KR | 1020120049587 A | 5/2012 |
| KR | 1020120132910 A | 12/2012 |
| KR | 101243752 B1 | 3/2013 |
| WO | 2014/101028 A1 | 7/2014 |

OTHER PUBLICATIONS

Anonymous, "Wi-Fi Requirements for Cable Modem Gateways: WR-SP-WiFi-GW-I01—100729", Jul. 2010, Cable Television Laboratories, XP 017848711, 19 pages total.

Communication (PCT/ISA/210) dated Dec. 5, 2014, issued by the International Searching Authority in counterpart International Application No. PCT/KR2014/007034.

Communication (PCT/ISA/220) dated Dec. 5, 2014, issued by the International Searching Authority in counterpart International Application No. PCT/KR2014/007034.

Communication (PCT/ISA/237) dated Dec. 5, 2014, issued by the International Searching Authority in counterpart International Application No. PCT/KR2014/007034.

Communication dated Feb. 27, 2017, issued by the European Patent Office in counterpart European Patent Application No. 14831388.5.

* cited by examiner

FIG. 11

| NTH AP DEVICE | | |
|---|---|---|
| num. | MAC ADDRESS INFORMATION | CONNECTED TIME |
| 1 | 12:4d:5c:28:9a:12 | 14:23:47:57 |
| 2 | ... | ... |
| 3 | ... | ... |

METHOD AND DEVICE FOR CONNECTING SINGLE AP DEVICE AMONG MULTIPLE AP DEVICES ON SAME NETWORK TO TERMINAL

CROSS-REFERENCE TO RELATED APPLICATIONS

This is a Continuation of U.S. application Ser. No. 14/909,344, filed Feb. 1, 2016, which is a National Stage Entry of PCT International Application No. PCT/KR2014/007034 filed Jul. 31, 2014, which claims priority from Korean Patent Application No. 10-2013-0091172 filed Jul. 31, 2013, the entire contents of each of which are herein incorporated by reference in their entireties.

TECHNICAL FIELD

The inventive concept relates to a method of connecting an AP device to a terminal, and more particularly, to a method of connecting one of a plurality of AP device on a same network to a terminal.

BACKGROUND ART

From among wireless networks, a user may access a desired wireless network by selecting the service set identifier (SSID) of the corresponding wireless network. Meanwhile, a wireless network consists of at least one or more AP devices. Although a user may select a wireless network by using a SSID, the user may not receive identification information regarding AP devices constituting the corresponding wireless network.

Particularly, since AP devices on a same network have a same SSID, it is difficult to distinguish one AP device from another, and thus a user may access an unintended AP device. As a result, network resources may not be efficiently utilized, and information may be leaked.

DETAILED DESCRIPTION OF THE INVENTION

Technical Problem

According to the inventive concept, if a plurality of AP devices exist on a same wireless network, terminals that may be connected to a certain AP device is limited, thereby improving efficiency of utilization of network resources and preventing information leakage.

Technical Solution

According to an embodiment of the inventive concept, a method by which an access point (AP) device from among a plurality of AP devices on a same network establishes a connection to a terminal, the method includes registering, by the AP device, media access control (MAC) address information regarding at least one or more terminals; receiving a connection request to the AP device from the terminal; and comparing the MAC address information regarding the terminal extracted from the connection request to the registered MAC address information and determining whether to connect the terminal to the AP device.

Advantageous Effects of the Invention

By setting identification information regarding a terminal to an AP device to connect the terminal to on a same network, a connection between the terminal and the AP device may be efficiently established. Furthermore, security may be improved by preventing a connection to an AP device not intended by a user.

DESCRIPTION OF THE DRAWINGS

FIG. 11 is a diagram for describing MAC address information registered to an AP device, according to an embodiment;

BEST MODE

Figure 1:
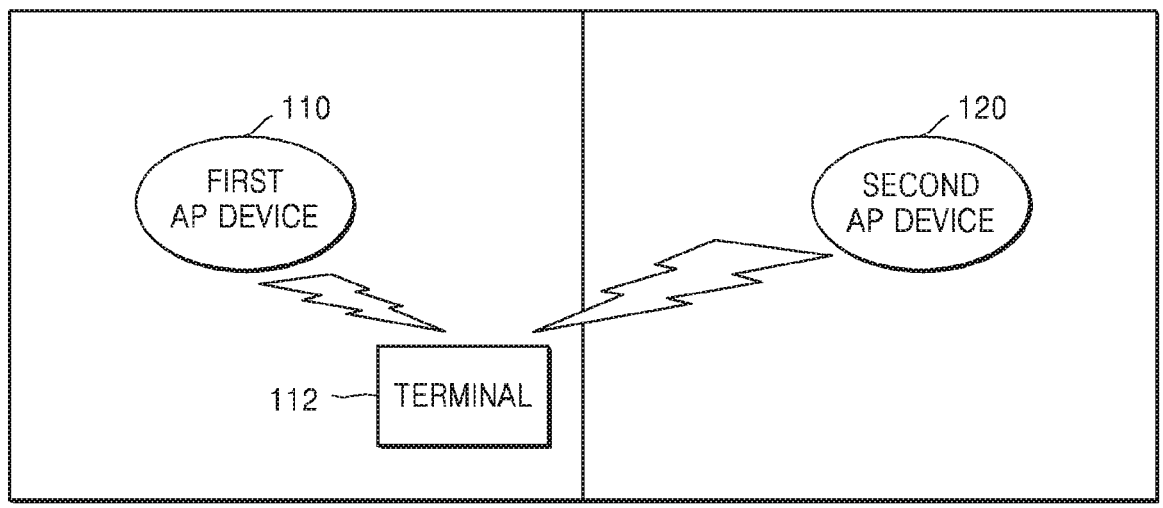
FIG. 1 is a diagram for describing a method of connecting a terminal to an AP device on a same wireless network.

According to an embodiment of the inventive concept, there is provided a method by which an access point (AP) device from among a plurality of AP devices on a same network establishes a connection to a terminal, the method including registering, by the AP device, media access control (MAC) address information regarding at least one or more terminals; receiving a connection request to the AP device from the terminal; and comparing the MAC address information regarding the terminal extracted from the connection request to the registered MAC address information and determining whether to connect the terminal to the AP device.

According to another embodiment of the inventive concept, there is provided a method by which a terminal establishes a connection to one access point (AP) device from among a plurality of AP devices on a same network, the method including transmitting, by the terminal, a connection request to the AP device; and determining whether to transmit a connection request to another AP device based on a decision of the AP device regarding the connection request, wherein the AP device compares the MAC address information regarding the terminal extracted from the connection request to MAC address information registered in advance and determines whether to connect the terminal to the AP device.

According to another embodiment of the inventive concept, there is provided an AP device that establishes a connection to a terminal, the AP device including a registerer, which registers MAC address information regarding at least one or more terminals; a communicator, which receives a connection request to the apparatus from the terminal; and a controller, which compares the MAC address information regarding the terminal extracted from the connection request to the registered MAC address information and determines whether to connect the terminal to the AP device, wherein the AP device is one of a plurality of AP devices on a same network.

According to another embodiment of the inventive concept, there is provided a terminal that establishes a connection to an AP device, the terminal including a transmitter, which transmits a connection request to the AP device; and a determiner, which determines whether to transmit a connection request to another AP device based on a decision of the AP device regarding the connection request, wherein the AP device compares the MAC address information regarding the terminal extracted from the connection request to MAC address information registered in advance and determines whether to connect the terminal to the AP device.

Mode of the Invention

Hereinafter, exemplary embodiments will be described more fully with reference to the accompanying drawings. This exemplary embodiments may, however, be embodied in many different forms and should not be construed as limited to the exemplary embodiments set forth herein. Rather, the exemplary embodiments are provided so that this disclosure will be thorough and complete, and will fully convey the scope of the inventive concept to those skilled in the art. In drawings, certain elements are omitted for clarity, and like elements denote like reference numerals throughout the specification.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, exemplary embodiments will be described in detail with reference to accompanying drawings.

FIG. 1 is a diagram for describing a method of connecting a terminal to an AP device on a same wireless network.

Referring to FIG. 1, a plurality of AP devices 110 and 120 and a terminal 112 may exist on a same wireless network. Here, the term 'same wireless network' may include wireless networks having a same service set identifier (SSID).

From among wireless networks, a user may access a desired wireless network by selecting the SSID of the corresponding wireless network. In detail, if AP devices do not exist on a same wireless network, the AP devices have different SSIDs. The user may select an AP device by selecting the SSID of the AP device for connecting the terminal 112 thereto.

Meanwhile, if AP devices exist on a same wireless network, the AP devices have a same SSID, and thus a terminal may be connected to an AP device not intended by a user. In detail, on a same wireless network, the terminal 112 may select an AP device based on a received signal strength index regarding AP devices.

For example, referring to FIG. 1, a second terminal 114 may receive signals from the first AP device 110 and the second AP device 120 having a same SSID. Here, it is assumed that the strength of a signal received from the second AP device 120 is greater than that of a signal received from the first AP device 110. If the AP devices 110 and 120 have a same SSID, the second terminal 114 may select a AP device based on strengths of received signals.

If an AP device to be connected to a terminal is determined only based on strengths of received signals on a same network, connection may be converged on a particular AP device, and thus it may be difficult to efficiently utilize network resources, such as a bandwidth. Furthermore, a terminal may be connected to an AP device not intended by a user, and thus a security problem, such as information leakage, may occur.

According to an embodiment, by setting identification information regarding an AP device to connect on a same network in advance, a connection between a terminal and an AP device may be efficiently established. Furthermore, a connection to an AP device not intended by a user may be prevented, thereby improving security.

Figure 2:
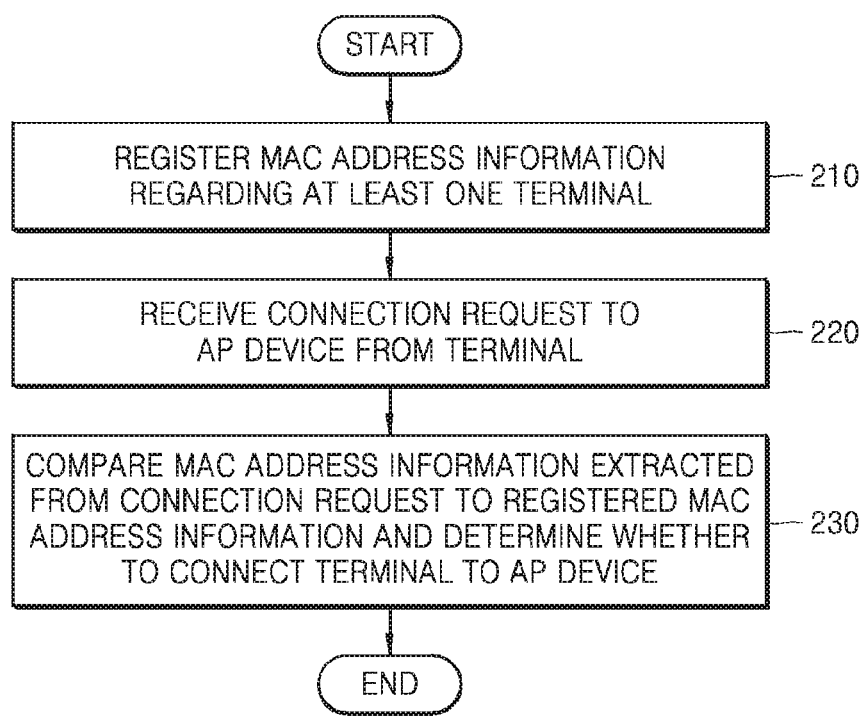
FIG. 2 is a flowchart for describing a method by which an AP device from among a plurality of AP devices on a same network establishes a connection to a terminal, according to an embodiment.

FIG. 2 is a flowchart for describing a method by which an AP device from among a plurality of AP devices on a same network establishes a connection to a terminal, according to an embodiment.

In operation 210, an AP device may register the media access control (MAC) addresses of at least one or more terminals.

According to an embodiment, the AP device may register MAC address information regarding at least one or more terminals received from an external device. Here, the external device may receive MAC addresses information regarding terminals via at least one of radio frequency identification (RFID) and near field communication (NFC). According to an embodiment, the external device may be a RFID reader or an NFC tag reader, but is not limited thereto.

Furthermore, the external device may include a quick response (QR) code reader. If MAC address information regarding a terminal is stored as a QR code, the AP device may receive MAC address information regarding the terminal by using the external device, that is, a QR code reader.

In operation 220, the AP device may receive a connection request to the AP device from a terminal. Here, the connection request may include MAC address information regarding the terminal.

Meanwhile, if a plurality of AP devices exist on a same network, a terminal may transmit a connection request to an AP device that transmitted the strongest signal to the terminal. Therefore, the AP device may receive connection requests from terminals other than the terminal registered in the operation 210.

According to an embodiment, a connection request may include information regarding a time point at which a corresponding terminal transmitted the connection request to an AP device.

In operation 230, the AP device may compare the MAC address information regarding the terminal extracted from the connection request received in the operation 220 to the MAC address information registered in the operation 210 and determine whether to connect the terminal to the AP device.

According to the method of connecting an AP device to a terminal according to an embodiment, it is only determined to establish connections to terminals having same MAC address information as registered MAC address information on a same network, thereby limiting terminals to be connected to the AP device.

Furthermore, according to another embodiment, based on at least one MAC address information registered to a certain AP device, data may be transmitted to terminals having the respective MAC address information.

For example, lecture data may be transmitted to terminals in a lecture room based on MAC address information regarding the respective terminals registered to an AP device. Students may authenticate their terminals via an external device, such as a RFID reader, for checking their attendance to a lecture, thereby registering MAC address information regarding the terminals to an AP device in a lecture room.

According to an embodiment, it may be determined whether to allow a certain terminal to access an external device based on MAC address information registered to an AP device. In detail, a terminal having MAC address information registered to the AP device may be allowed to access an external terminal via an authentication process based on MAC address information (e.g., a log-in process). Furthermore, the terminal that is allowed to access the external server may obtain lecture data from the external server.

According to an embodiment, data may be transmitted only to particular terminals corresponding to MAC address information registered to an AP device, and thus data security may be improved.

Figure 3:
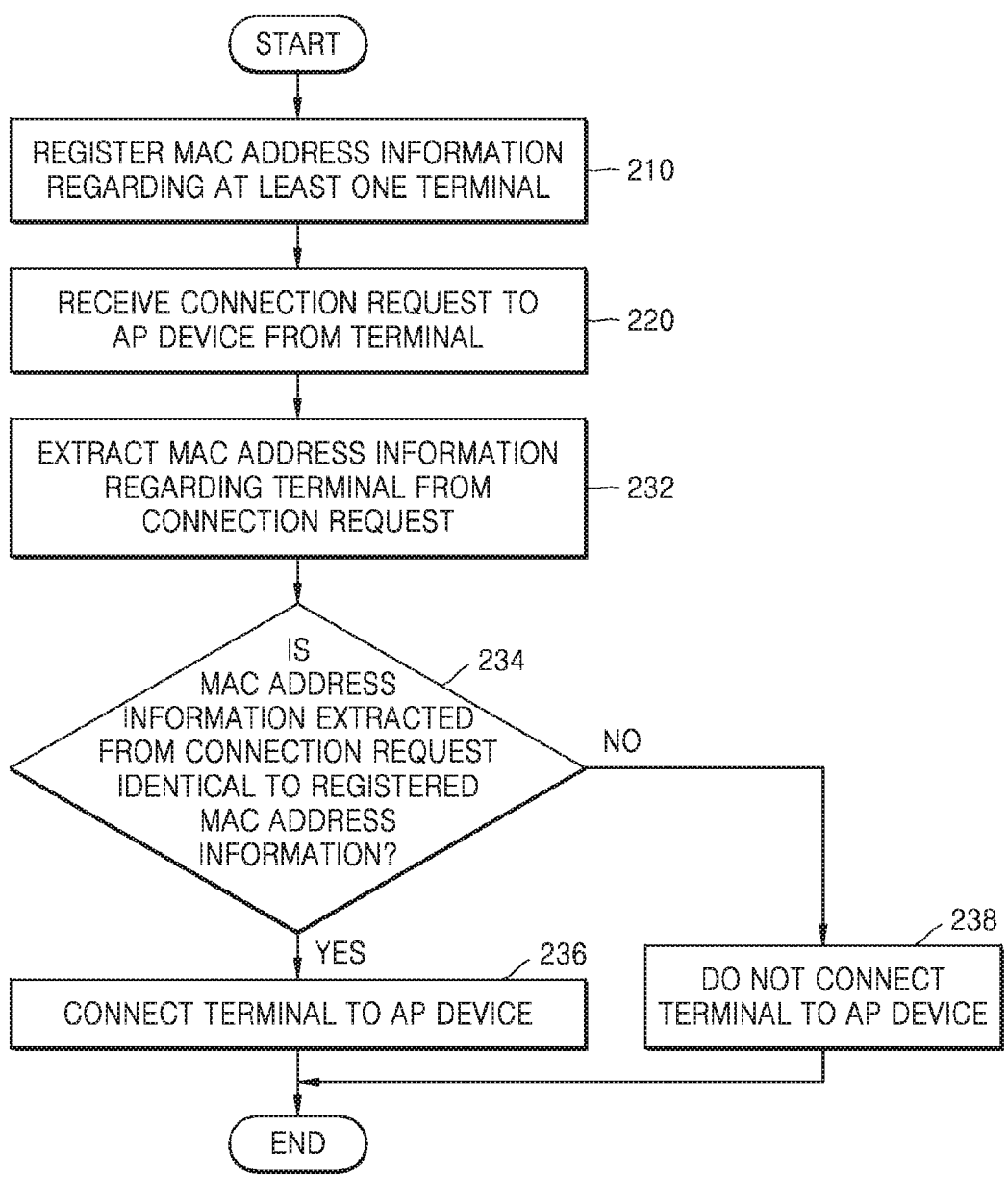
FIG. 3 is a detailed flowchart showing a method by which an AP device determines whether to be connected to a terminal, according to an embodiment.

FIG. 3 is a detailed flowchart showing a method by which an AP device determines whether to be connected to a terminal, according to an embodiment.

In operation 210, an AP device may register MAC address information of at least one terminal. According to an embodiment, the AP device may register MAC address information of at least one terminal that is received from an external device. Here, the external device may include a RFID reader, an NFC tag reader, and a QR code reader.

In operation 220, the AP device may receive a connection request to the AP device from a terminal. Here, the connection request may include MAC address information regarding the terminal.

In operation 232, the AP device may extract MAC address information regarding the terminal from the connection request received in the operation 220. The AP device may identify the terminal by using the extracted MAC address information regarding the terminal.

However, identification information regarding a terminal is not limited to MAC address information. For example, in case of being used at an organization like a company or a school, a terminal may include unique identification information allocated by the organization to a user of the corresponding terminal in a connection request and transmit the connection request.

In case of using unique identification information allocated to a user, a plurality of terminals possessed by the user may be managed under a single identification number, and thus an AP device intended by the user may be selected without transmitting identification information regarding the plurality of devices to the AP device. Even in such a case, MAC address information regarding the terminals may be additionally utilized, thereby limiting connections of some of the terminals possessed by the user to the AP device.

In operation 234, the AP device may compare the MAC address information regarding the terminal extracted in the operation 232 and the MAC address information registered in the operation 210. The AP device may determine whether to establish a connection between the terminal and the AP device based on whether the MAC address information regarding the terminal is identical to the registered MAC address information.

In operation 236, since it is determined in the operation 234 that the MAC address information regarding the terminal is identical to the registered MAC address information, the AP device may connect the terminal to the AP device. When the terminal is connected to the AP device, the AP device may transmit a connection completion message to the terminal, thereby providing information indicating that the terminal is connected to the AP device.

In operation 238, since it is determined in the operation 234 that the MAC address information regarding the terminal is not identical to the registered MAC address information, the AP device may not connect the terminal to the AP device. When the terminal is not connected to the AP device, the AP device may transmit a connection failure message to the terminal, thereby providing information indicating that the terminal is not connected to the AP device.

Figure 4:
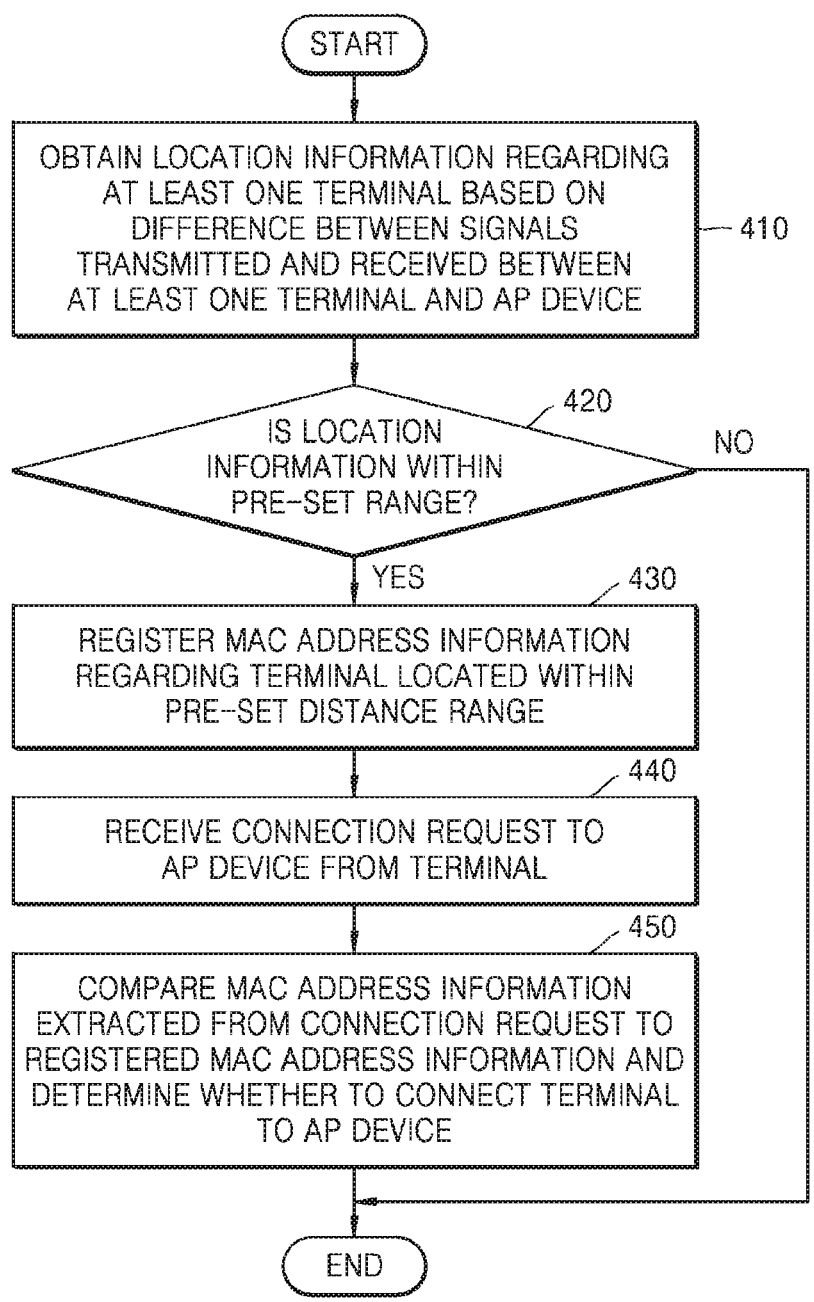
FIG. 4 is a diagram for describing a method by which an AP device determines whether to be connected to a terminal based on MAC address information registered based on location information regarding at least one terminal.

FIG. 4 is a diagram for describing a method by which an AP device determines whether to be connected to a terminal based on MAC address information registered based on location information regarding at least one terminal.

In operation 410, the AP device may obtain location information regarding at least one terminal. An AP device according to an embodiment may obtain location information regarding at least one terminal based on information regarding time period elapsed for exchanging a signal with the at least one terminal and information regarding speed of the signal. However, it is merely an embodiment of the inventive concept, and methods by which an AP device obtains location information regarding at least one terminal are not limited thereto.

In operation 420, the AP device may determine whether each of the at least one terminal is located within a pre-set distance range from the AP device based on the obtained location information regarding the at least one terminal. Here, the pre-set distance range may be the basis for determining whether to register MAC address information regarding a corresponding terminal to the AP device.

Meanwhile, if a plurality of AP devices exist, different distances may be set to the plurality of AP devices, respectively. Furthermore, a distance may be determined based on characteristics of a space covered by an AP device. For example, if a first AP device is located at a first lecture room and a second AP device is located at a second lesion room, the pre-set distance range regarding the first AP device may be set in correspondence to the size of the first lecture room, whereas the pre-set distance range regarding the second AP device may be set in correspondence to the size of the second lecture room.

In operation 430, the AP device may register MAC address information regarding a terminal located within the pre-set distance range. For example, the AP device may register MAC address information regarding a terminal existing within the pre-set distance range from among the at least one or more terminals.

In operation 440, the AP device may receive a connection request to the AP device from a terminal. Here, the connection request may include MAC address information regarding the corresponding terminal. Here, the operation 440 may correspond to the operation 220 described above with reference to FIG. 2.

In operation 450, the AP device may compare the MAC address information regarding the corresponding terminal extracted from the connection request in the operation 220 to the MAC address information registered in the operation 210 and determine whether to connect the corresponding terminal to the AP device. Here, the operation 450 may correspond to the operation 230 described above with reference to FIG. 2.

Meanwhile, the AP device according to an embodiment may update MAC address information registered based on location information regarding at least one or more terminal. For example, the AP device may obtain information regarding movements of the at least one or more terminals based on a difference between signals respectively transmitted by the at least one or more terminals.

If it is determined by the AP device based on a difference between signals transmitted by a first terminal that the first terminal is moving away from the AP device, the AP device may delete the registered MAC address information regarding the first terminal. On the contrary, if it is determined by the AP device based on a difference between signals transmitted by the first terminal that the first terminal is approaching to the AP device, the AP device may maintain the registered MAC address information regarding the first terminal.

Figure 5:
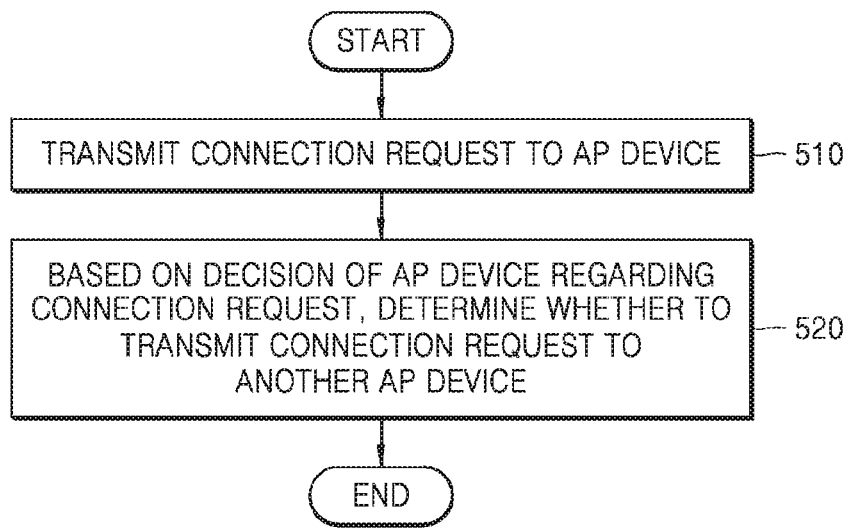
FIG. 5 is a flowchart for describing a method by which a terminal establishes a connection to one from among a plurality of AP devices on a same network, according to an embodiment.

FIG. 5 is a flowchart for describing a method by which a terminal establishes a connection to one from among a plurality of AP devices on a same network, according to an embodiment.

In operation 510, a terminal may transmit a connection request to an AP device. If a plurality of AP devices exist on a same network, the terminal may transmit a connection request to an AP device that transmitted the strongest signal to the terminal. Here, the connection request may include MAC address information regarding the terminal.

In operation 520, the terminal may determine whether to transmit a connection request to another AP device based on a decision of the AP device regarding the connection request transmitted in the operation 510.

In detail, the AP device may compare MAC address information regarding the terminal extracted from the connection request to MAC address information registered to the AP device in advance and determine whether to connect the terminal to the AP device. According to an embodiment, the AP device may register MAC address information regarding at least one terminal received from an external device. Here, the external device may receive MAC addresses information regarding terminals via at least one of radio frequency identification (RFID) and near field communication (NFC). For example, the external device may be a RFID reader or an NFC tag reader.

Furthermore, the external device may include a quick response (QR) code reader. If MAC address information regarding a terminal is stored as a QR code, the AP device may receive MAC address information regarding the terminal by using the external device, that is, a QR code reader.

Figure 6:
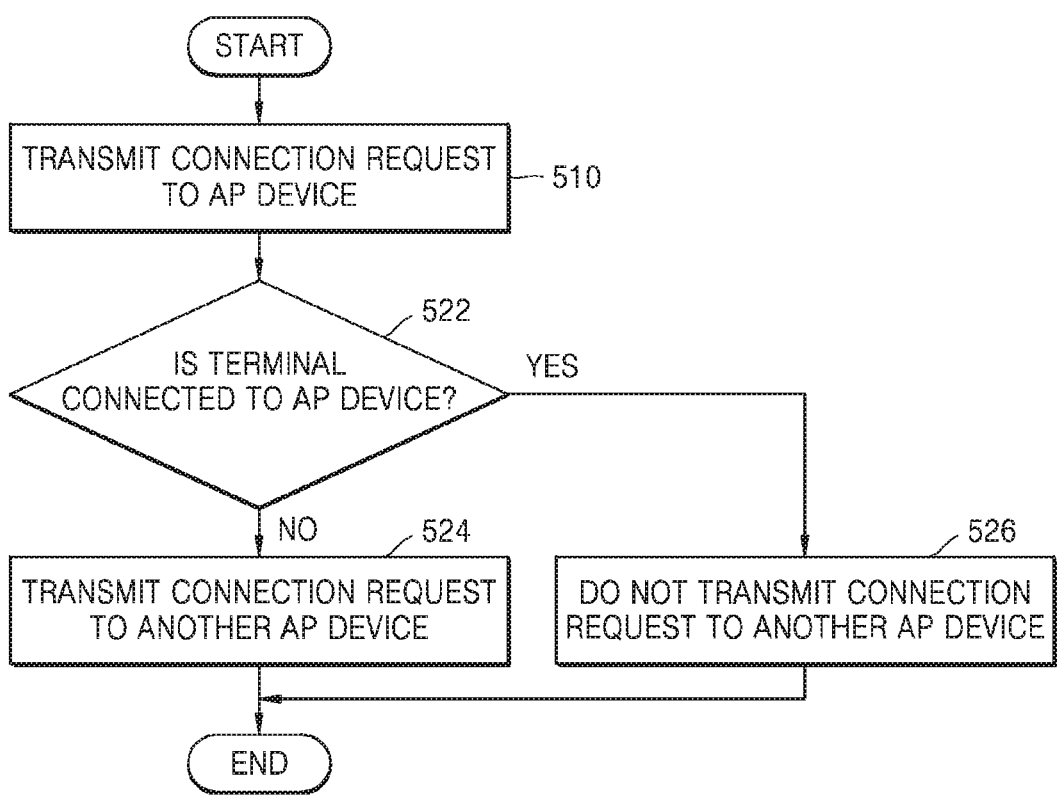
FIG. 6 is a detailed flowchart showing a method by which an terminal determines whether to be transmit a connection request to another AP device, according to an embodiment.

FIG. 6 is a detailed flowchart showing a method by which a terminal determines whether to be transmit a connection request to another AP device, according to an embodiment.

In operation 510, a terminal may transmit a connection request to a first AP device.

In operation 522, the terminal may check a decision of the first AP device regarding a connection to the terminal based on the connection request transmitted in the operation 510. Here, the first AP device may determine whether to connect the terminal to the first AP device based on whether MAC address information regarding the terminal is identical to MAC address information registered to the first AP device.

If MAC address information regarding the terminal is identical to MAC address information registered to the first AP device, the first AP device may connect the terminal to the first AP device. When the terminal is connected to the first AP device, the AP device may transmit a connection completion message to the terminal, thereby providing information indicating that the terminal is connected to the first AP device.

On the contrary, if MAC address information regarding the terminal is not identical to MAC address information registered to the first AP device, the first AP device may not connect the terminal to the first AP device. When the terminal is not connected to the first AP device, the first AP device may transmit a connection failure message to the terminal, thereby providing information indicating that the terminal is not connected to the first AP device. The terminal may confirm that the terminal is not connected to the first AP device based on the connection failure message received from the first AP device.

In operation 524, when it is checked in the operation 522 that the terminal is not connected to the first AP device, the terminal may transmit a connection request to a second AP device. When the connection request is transmitted to the second AP device, the terminal may attempt a connection to the second AP device by repeating the series of operations shown in FIGS. 5 and 6.

In operation 526, when it is checked in the operation 522 that the terminal is connected to the first AP device, the terminal may not transmit a connection request to the second AP device.

Figure 7:
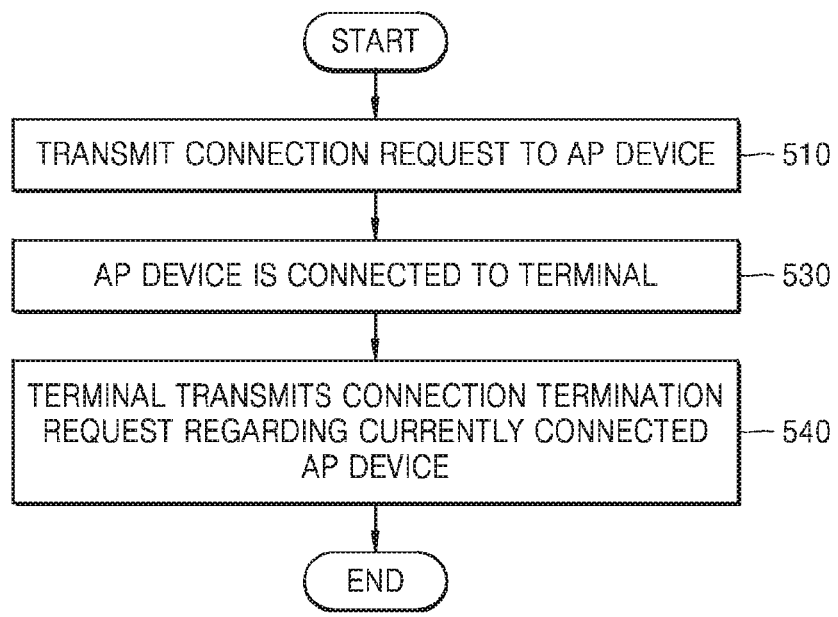
FIG. 7 is a flowchart showing a method by which a terminal terminates a connection to an AP device, according to an embodiment.

FIG. 7 is a flowchart showing a method by which a terminal terminates a connection to an AP device, according to an embodiment.

In operation 510, a terminal may transmit a connection request to an AP device. In operation 530, based on a decision of the AP device regarding the connection request transmitted in the operation S510, the terminal may be connected to the AP device. In operation 540, the terminal may transmit a connection termination request to the currently connected AP device. A connection termination request according to an embodiment may be generated by authenticating the terminal via an external device once again.

Here, the connection termination request may be transmitted as a signal identical to a connection request. However, if MAC address information regarding a terminal is already registered to an AP device and the same MAC address information is received once again, the AP device may delete the registered MAC address information. Furthermore, a connection between the AP device and a corresponding terminal may be terminated simultaneously as the MAC address information is deleted.

However, it is merely an embodiment of the inventive concept, and a connection termination request may be defined as a signal that may be distinguished from a connection request in advance and transmitted.

Figure 8:
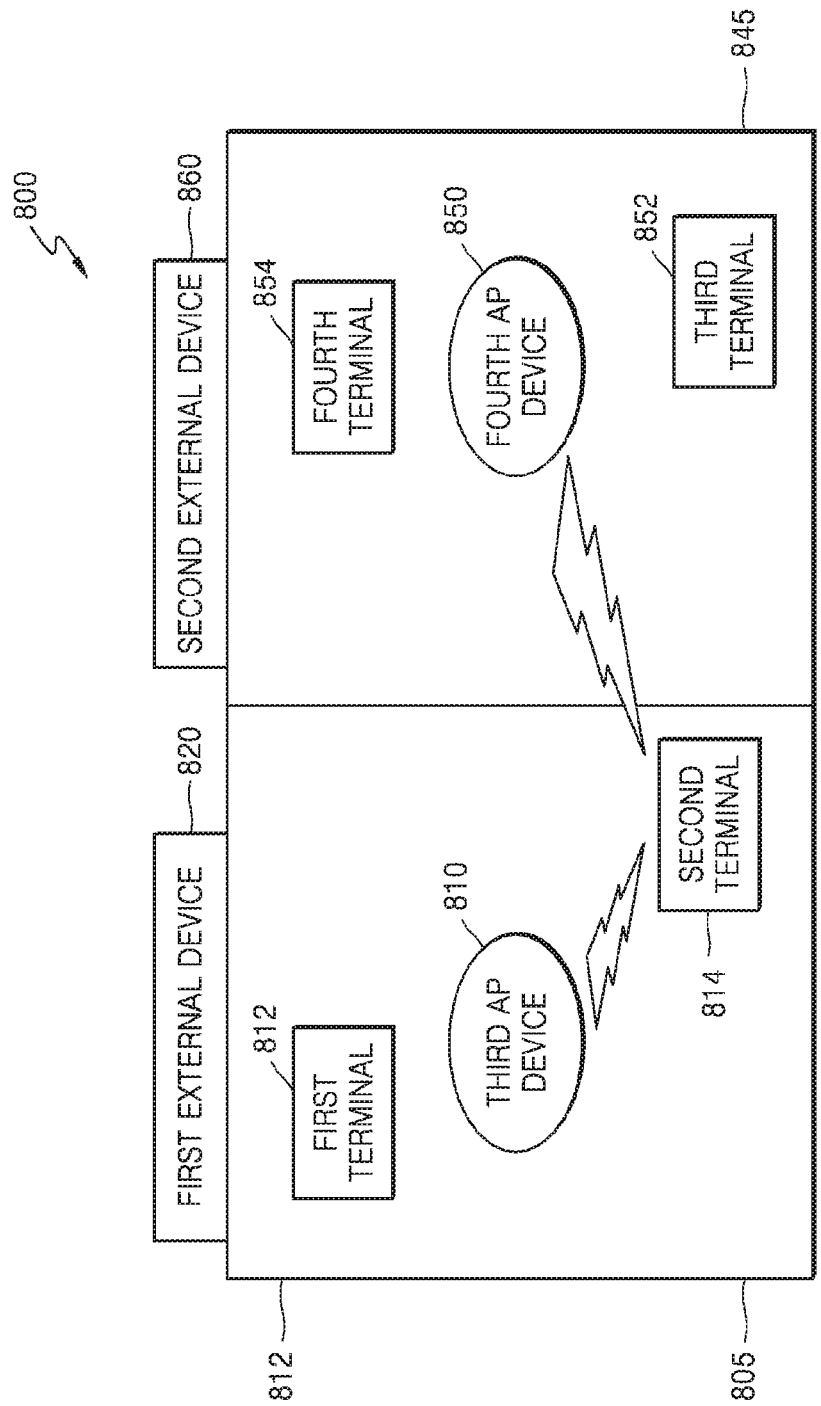
FIG. 8 is a diagram for describing a system for connecting one from among a plurality of AP devices on a same network to a terminal, according to an embodiment.

FIG. 8 is a diagram for describing a system for connecting one from among a plurality of AP devices on a same network to a terminal, according to an embodiment.

Referring to FIG. 8, a system 800 for connecting an AP device to a terminal according to an embodiment may include at least one or more AP devices 810 and 850, terminals 812, 814, 852, and 854, and external devices 820 and 860.

FIG. 8 shows only components of the system 800 for connecting an AP device to a terminal that are related to the present embodiment. Therefore, it would be obvious to one of ordinary skill in the art that the system 800 may further include general-purpose components other than the components shown in FIG. 8.

In FIG. 8, it is assumed that a first terminal 812 and a second terminal 814 exist in a same space as a third AP device 810, and a third terminal 852 and a fourth terminal 854 exist in a same space as a fourth AP device 850. Furthermore, it is assumed that signals received by the respective terminals from the fourth AP device 850 are stronger than signals received from the third AP device 810.

Users of the respective terminals may transmit MAC address information regarding the respective terminals to AP devices by using external devices located in the respective spaces. The first terminal 812 and the second terminal 814 located in a first space 805 may transmit MAC address information to the third AP device 810 by using a first external device 820. The MAC address information received from the first terminal 812 and the second terminal 814 may be registered to the third AP device 810.

Meanwhile, the third terminal 852 and the fourth terminal 854 located in a second space 845 may transmit MAC address information to the fourth AP device 850 by using a second external device 860. The MAC address information received from the third terminal 852 and the fourth terminal 854 may be registered to the fourth AP device 850.

To be connected to a wireless network, the first terminal 812 may select one AP device. Since the third AP device 810 and the fourth AP device 850 exist on a same network, SSID information regarding the third AP device 810 is identical to that of the fourth AP device 850. In such a case, a terminal may select an AP device based on the strength of received signals. Therefore, according to the above-stated assumption, the first terminal 812 may select the fourth AP device 850.

The second terminal 814 may transmit a connection request to the fourth AP device 850. Here, the connection request may include the MAC address information regarding the second terminal 814. The fourth AP device 850 may extract the MAC address information regarding the second terminal 814 from the received connection request and compare the extracted MAC address information to MAC address information registered to the fourth AP device 850.

Since MAC address information regarding the third terminal 852 and the fourth terminal 854 is registered to the fourth AP device 850, MAC address information identical to the MAC address information regarding the second terminal 814 does not exist in the fourth AP device 850. In this case, the fourth AP device 850 may not connect the second terminal 814 to the fourth AP device 850. Furthermore, the fourth AP device 850 may transmit a connection failure message to the second terminal 814, thereby providing information indicating connection failure to the second terminal 814.

Since the second terminal 814 failed to be connected to the fourth AP device 850, the second terminal 814 may transmit a connection request to another AP device, that is, the third AP device 810. In this case, since the MAC address information regarding the second terminal 814 is registered to the third AP device 810, the third AP device 810 may connect the second terminal 814 to the third AP device 810.

According to another embodiment, based on at least one of MAC address information registered to the third AP device 810, data may be transmitted to the first terminal 812 and the second terminal 814. Furthermore, based on at least one of MAC address information registered to the fourth AP device 850, data may be transmitted to the third terminal 852 and the fourth terminal 854.

For example, it is assumed that a class is going on at a lecture room A, which is the first space 805, and an exam regarding the same subject as the class at the lecture room A is going on at a lecture room B, which is the second space 845. The lecturer of the lecture room B may transmit exam questions to the terminals 852 and 854 of students at the lecture room B by using the fourth AP device 850. In detail, exam questions stored in an external server may be transmitted to the respective terminals 852 and 854 by using MAC address information regarding the terminals 852 and 854 registered to the fourth AP device 850.

However, since the exam regarding the same subject as the class at the lecture room A is going on at the lecture room B, the exam questions must not be leaked to the lecture room A. If the fourth AP device 850 does not authenticate terminals based on MAC address information, the first terminal 812 at the lecture room A may obtain the exam questions transmitted to the third terminal 852 and the fourth terminal 854 at the lecture room B by maliciously stealing an IP address and a port number used at the lecture room B. In this case, the exam questions for the lecture room B, which is the second space 845, may be leaked to the first terminal 812.

According to an embodiment, if the fourth AP device 850 authenticates a terminal based on MAC address information, since the MAC address information regarding the first terminal 812 is not registered to the fourth AP device 850, the first terminal 812 is unable to receive the exam questions from the fourth AP device 850. Therefore, a method of connecting an AP device to a terminal may maintain security to prevent data transmitted to a particular space from being leaked to another space.

Figure 9:
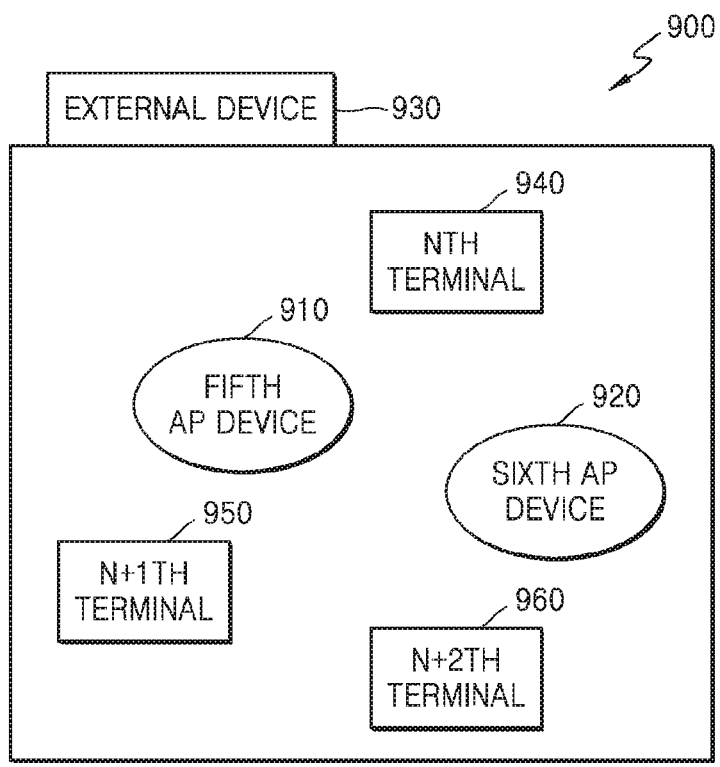
FIG. 9 is a diagram for describing a system for connecting one from among a plurality of AP devices on a same network to a terminal, according to another embodiment.

FIG. 9 is a diagram for describing a system for connecting one from among a plurality of AP devices on a same network to a terminal, according to another embodiment.

Referring to FIG. 9, a system 900 for connecting an AP device to a terminal according to an embodiment may include at least one or more AP devices 910 and 950, terminals 940, 950, and 960, and an external devices 930.

FIG. 9 shows only components of the system 900 for connecting an AP device to a terminal that are related to the present embodiment. Therefore, it would be obvious to one of ordinary skill in the art that the system 900 may further include general-purpose components other than the components shown in FIG. 9.

According to an embodiment, it is assumed that a plurality of AP devices exist in a same space. If a plurality of AP devices exist in a same space, criteria for allocating and registering MAC address information regarding terminals recognized by the external device 930 to the plurality of AP devices may be problematic.

For example, a case where a fifth AP device 910 and a sixth AP device 920 exist in a same space and MAC address information regarding an $n^{th}$ terminal 940, an $n+1^{th}$ terminal 950, and an $n+2^{th}$ terminal 960 are to be registered to the AP devices 910 and 920 may be assumed.

According to an embodiment, MAC address information regarding the respective terminals 940, 950, and 960 may be alternately registered to the fifth AP device 910 and the sixth AP device 920. For example, the MAC address information regarding the $n^{th}$ terminal 940, which is the first terminal recognized by the external device 930, may be registered to the fifth AP device 910, and then the MAC address information regarding the $n+1^{th}$ terminal 950, which is the second terminal recognized by the external device 930, may be registered to the sixth AP device 920. Next, the MAC address information regarding the $n+2^{th}$ terminal 960, which is the third terminal recognized by the external device 930, may be registered to the fifth AP device 910.

However, even if terminals are alternately allocated to respective AP device, each of the terminals may terminate a connection or re-establishes a connection after a termination. According to an embodiment, for efficient utilization of network resources, the number of terminals connected to each of AP devices may be counted, and an AP device to be connected to a certain terminal may be determined based on a counted result.

For example, the MAC address information regarding the $n^{th}$ terminal 940 may be registered to the fifth AP device 910, whereas the MAC address information regarding the $n+1^{th}$ terminal 950 may be registered to the sixth AP device 920. Here, if the $n+1^{th}$ terminal 950 terminates a connection before the $n+1^{th}$ terminal 950 is recognized by the external device 930, the MAC address information regarding the $n+2^{th}$ terminal 960 may be registered to the sixth AP device 920.

In case of alternately registering MAC address information regarding terminals to AP devices, the MAC address information regarding the $n+2^{th}$ terminal 960 may be registered to the fifth AP device 910 in principle. However, according to an embodiment, since the number of terminals registered to the fifth AP device 910 is greater than the number of terminals registered to the sixth AP device 920, the MAC address information regarding the $n+2^{th}$ terminal 960 may be registered to the sixth AP device 920 for efficient utilization of network resources.

However, the method of registering MAC address information regarding a newly recognized terminal based on the number of terminals registered to each of AP devices is merely an embodiment of the inventive concept, and a method of registering MAC address information regarding each terminal to an AP device is not limited thereto.

In another example, MAC address information regarding terminals may be registered to all of a plurality of AP devices existing in a same space. If the fifth AP device 910, the sixth AP device 920, the $n^{th}$ terminal 940, the $n+1^{th}$ terminal 950, and the $n+2^{th}$ terminal 960 exist in a same space, the MAC address information regarding the $n^{th}$ terminal 940, the $n+1^{th}$ terminal 950, and the $n+2^{th}$ terminal 960 may be registered to both of the fifth AP device 910 and the sixth AP device 920. If a plurality of AP devices exist in a same space and MAC addresses regarding all terminals are registered to each of the plurality of AP devices, a terminal may select an AP device to be connected to based on signal strength. For example, a terminal may attempt to be connected to an AP device corresponding to a relatively strong signal from among a plurality of AP devices existing in a same space.

Figure 10:
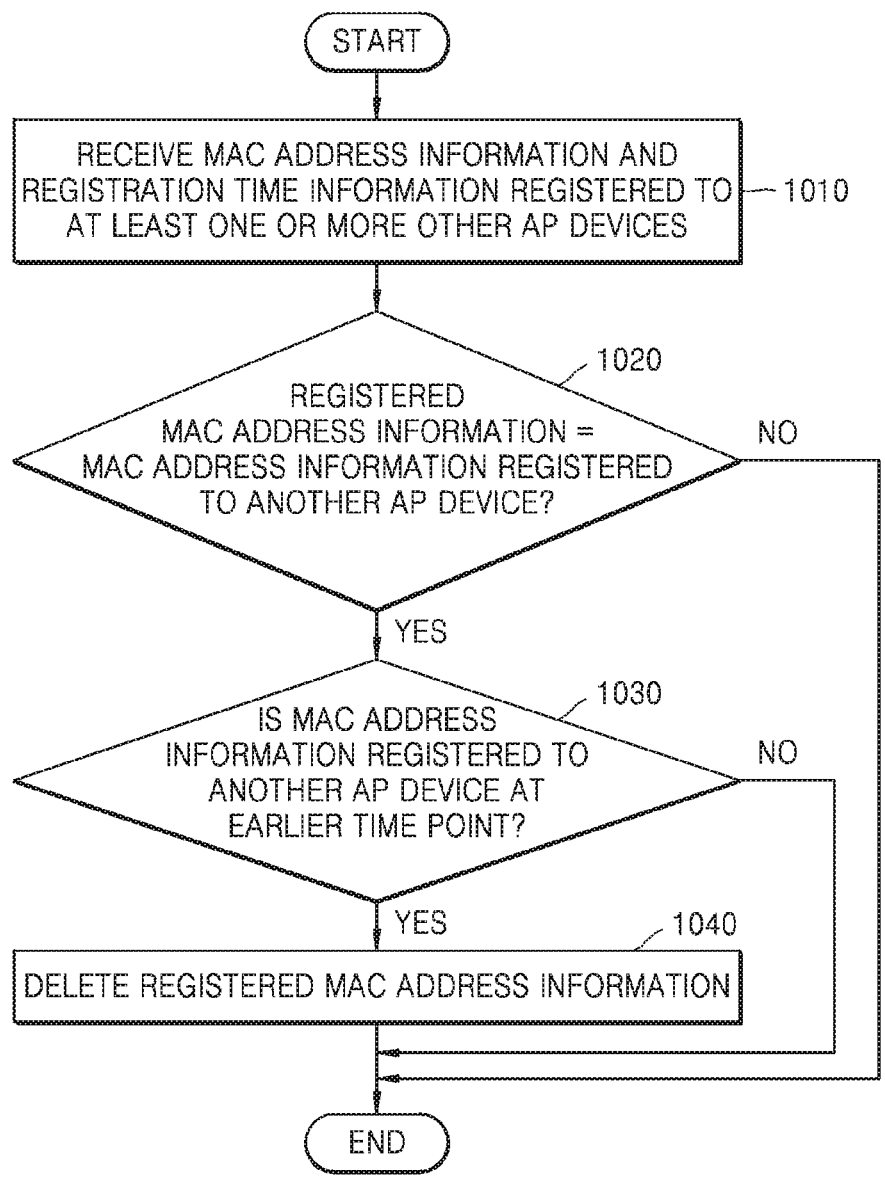
FIG. 10 is a diagram for describing a method by which an AP device manages MAC address information registered to the AP device based on MAC address information received from another AP device, according to an embodiment.

FIG. 10 is a diagram for describing a method by which an AP device manages MAC address information registered to the AP device based on MAC address information received from another AP device, according to an embodiment.

Hereinafter, for convenience of explanation, the AP device will be referred to as a first AP device, whereas the other AP device will be referred to as a second AP device. In operation 1010, the first AP device may receive second MAC address information registered to the second AP device and information regarding a time point at which the second MAC address information is registered. For example, if the second MAC address information regarding a terminal is registered to the second AP device, the second AP device may transmit the second MAC address information regarding the terminal and information regarding a time point at which the second MAC address information is registered to other AP devices on a same network, such as the first AP device. In operation 1020, the first AP device may compare first MAC address information registered thereto to the received second MAC address information. The first AP device may determine whether the second MAC address information registered to the at least one second AP device is identical to the first MAC address information registered to the first AP device. In operation S1030, the first AP device may determine that a time point at which the first MAC address information is registered to the first AP device is earlier than the time point at which the second MAC address information is registered to the at least one second AP device. If the first MAC address information is identical to the second MAC address information, the first AP device according to an embodiment may compare the time point at which the first MAC address information is registered to the first AP device to the time point at which the second MAC address information is registered to the at least one second AP device. Here, by comparing the time points at which the first MAC address information and the second MAC address information are registered to the respective AP devices, an AP device to which a terminal is most recently registered may be determined. In operation 1040, the first AP device may delete the registered first MAC address information. If the time point at which the first MAC address information is registered to the first AP device is earlier than the time point at which the second MAC address information is registered to the at least one second AP device, the first AP device according to an embodiment may delete the first MAC address information stored in the first AP device.

FIG. 11 is a diagram for describing MAC address information registered to an AP device, according to an embodiment.

Referring to FIG. 11, MAC address information regarding a terminal may be registered to an AP device as a table. After an AP device receives and registers MAC address information regarding a terminal, the AP device may determine whether to accept a connection request of a terminal that is input later, based on the registered MAC address information. If MAC address information registered to the AP device is identical to MAC address information regarding a terminal included in a connection request, the AP device may connect the corresponding terminal to the AP device.

Meanwhile, the AP device may further receive connection time information together with MAC address information. Here, the connection time information indicates a time point at which a terminal transmitted the MAC address information thereof to the AP device via an external device.

Based on the connection time information, the AP device may determine a time period elapsed after the external device recognized the corresponding terminal. If the time period elapsed after the external device recognized the corresponding terminal exceeds a pre-set time interval, the MAC address information regarding the corresponding terminal registered to the AP device may be deleted.

Furthermore, according to an embodiment, the AP device may transmit MAC address information and connection time information regarding registered terminals to a server. The server may manage the terminals registered to each of AP devices by using the information received from the AP devices.

Figure 12:
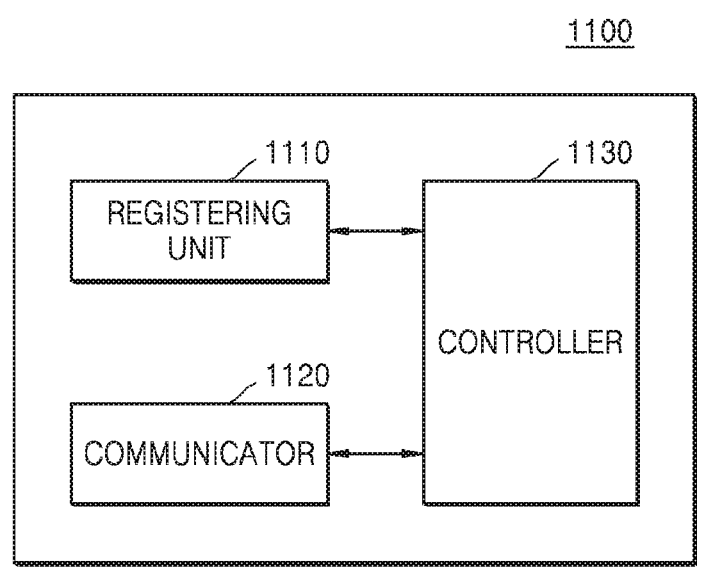
FIG. 12 is a block diagram showing an AP device that establishes a connection to a terminal, according to an embodiment.

FIG. 12 is a block diagram showing an AP device 1100 that establishes a connection to a terminal, according to an embodiment.

Referring to FIG. 12, the AP device 1100 according to an embodiment may include a registerer 1110, a communicator 1120, and a controller 1130.

FIG. 12 shows only components of the AP device 1100 that are related to the present embodiment. Therefore, it would be obvious to one of ordinary skill in the art that the AP device 1100 may further include general-purpose components other than the components shown in FIG. 12.

The registerer 1110 may register MAC address information regarding at least one or more terminals. According to an embodiment, the AP device may register MAC address information regarding at least one or more terminals received from an external device. Here, the AP device is any one from among a plurality of AP devices on a same network. Furthermore, the external device may include a RFID reader, an NFC tag reader, and a QR code reader. If MAC address information regarding a terminal is stored as a QR code, the AP device may receive MAC address information regarding the terminal by using the external device, that is, a QR code reader.

The communicator 1120 may receive a connection request to the AP device from a terminal. According to an embodiment, the connection request may include the MAC address information regarding the corresponding terminal.

Meanwhile, the communicator 1120 may receive MAC address information regarding at least one or more terminal registered to a second AP device on the same network from a server to manage MAC address information registered to the AP device. Here, the server may manage MAC address information registered to at least one or more AP devices existing on a same network.

Meanwhile, the communicator 1120 may receive MAC address information regarding terminals registered to the second AP device from the server every time MAC address information regarding a new terminal is registered to the AP device. However, embodiments of the inventive concept are not limited thereto. The communicator 1120 may receive MAC address information regarding terminals registered to the second AP device from the server at a pre-set time interval.

The controller 1130 may compare MAC address information regarding the terminal extracted from the connection request to MAC address information registered to the AP device and determine whether to connect the terminal to the AP device In detail, the controller 1130 may extract MAC address information regarding the terminal from the received connection request. The controller 1130 may identify the terminal by using the extracted MAC address information regarding the terminal. The controller 1130 may compare the extracted MAC address information regarding the terminal to registered MAC address information. The controller 1130 may determine whether to connect the terminal to the AP device based on whether the MAC address information regarding the terminal is identical to registered MAC address information.

For example, if the MAC address information regarding the terminal is identical to MAC address information registered to the AP device, the controller 1130 may connect the terminal to the AP device. When the terminal is connected to the AP device, the controller 1130 may transmit a connection completion message to the terminal, thereby providing information indicating that the terminal is connected to the AP device.

Furthermore, if the MAC address information regarding the terminal is not identical to MAC address information registered to the AP device, the controller 1130 may not connect the terminal to the AP device. When the terminal is not connected to the AP device, the controller 1130 may transmit a connection failure message to the terminal, thereby providing information indicating that the terminal is not connected to the AP device Meanwhile, the controller 1130 may compare MAC address information registered by using information received by the communicator 1120 from a server to MAC address information registered to another AP device on a same network. If it is determined as a result of the comparison that MAC address information identical to MAC address information registered to the second AP device is registered, only one of the AP devices may be selected as an AP device with valid registration.

If registered MAC address information is determined as being identical to MAC address information registered to another AP device, the controller 1130 may transmit a deletion request signal to a terminal to delete the MAC address information registered to the second AP device. Furthermore, if registered MAC address information is determined as not being identical to MAC address information registered to another AP device, the controller 1130 may maintain the registered MAC address information without performing any further operation.

On the other hand, according to an embodiment, various methods of managing registered MAC address information may be employed other than the method of managing registered MAC address information based on MAC address information received from a server.

For example, the controller 1130 may delete registered MAC address information at a pre-set time interval. In detail, if a time period that MAC address information is being registered to an AP device exceeds a pre-set time period, the corresponding registered MAC address information may be automatically deleted. A time period that MAC address information is being registered may be determined based on connection time information regarding a corresponding terminal. Here, the connection time information indicates a time point at which the terminal transmitted the MAC address information thereof to the AP device via an external device.

Furthermore, the controller 1130 may determine a time period elapsed after an external device recognized a terminal. If a time period elapsed after the external device recognized the terminal exceeds a pre-set time interval, the MAC address information regarding the corresponding terminal registered to an AP device may be deleted.

Additionally, the controller 1130 may delete MAC address information registered to all AP devices on a same network at once at a particular time point.

According to another embodiment, if MAC address information regarding a terminal is already registered to an AP device, a user may delete the registered MAC address information regarding the terminal by authenticating the MAC address information regarding the same terminal to the same AP device once again. If the AP device is connected to the terminal, the user may terminate the connection between the AP device and the terminal by transmitting the MAC address information regarding the same terminal to the AP device by using an external device once again. The controller 1130 may compare MAC address information registered to the AP device to newly-input MAC address information and confirm that the MAC address information regarding the same terminal is input once again.

Figure 13:
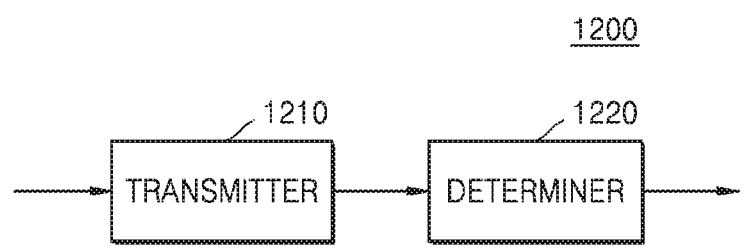
FIG. 13 is a block diagram showing a terminal that establishes a connection to an AP device, according to an embodiment.

FIG. 13 is a block diagram showing a terminal 1200 that establishes a connection to an AP device, according to an embodiment.

Referring to FIG. 13, the terminal 1200 according to an embodiment may include a transmitter 1210 and a determiner 1220.

FIG. 13 shows only components of the terminal 1200 that are related to the present embodiment. Therefore, it would be obvious to one of ordinary skill in the art that the terminal 1200 may further include general-purpose components other than the components shown in FIG. 13.

The transmitter 1210 may transmit a connection request to an AP device. If a plurality of AP devices exist on a same network, the terminal 1200 may transmit a connection request to an AP device that transmitted the strongest signal from among the plurality of AP devices. Here, the connection request may include MAC address information regarding the terminal 1200.

The determiner 1220 may determine whether to transmit a connection request to another AP device based on a decision of the AP device regarding the connection request. If the AP device determined to connect the terminal 1200 to the AP device, the determiner 1220 may not transmit a connection request to another AP device. However, if the AP device determined not to connect the terminal 1200 to the AP device, the determiner 1220 may transmit a connection request to another AP device.

Figure 14:
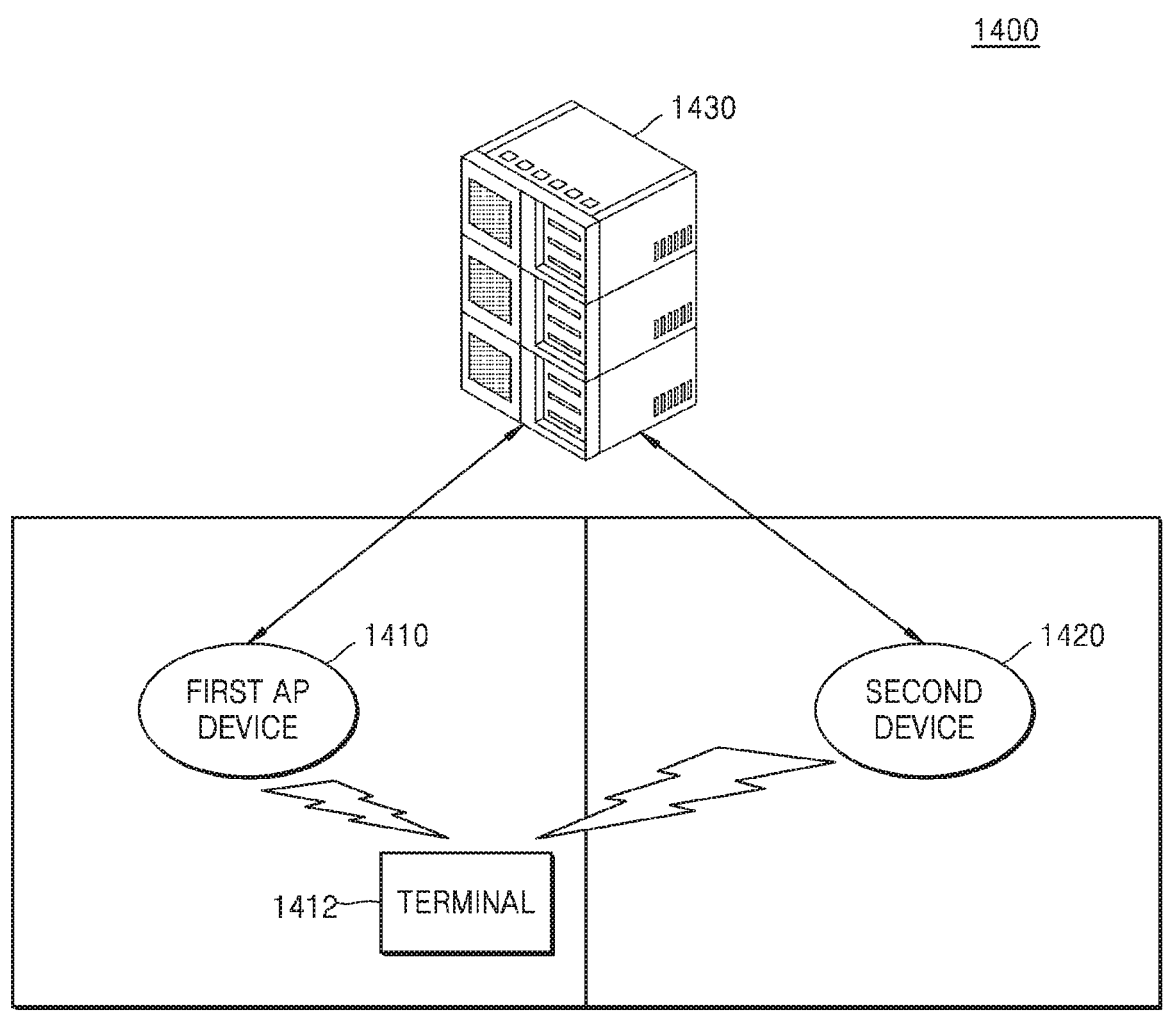
FIG. 14 is a diagram for describing a system for connecting one from among a plurality of AP devices on a same network to a terminal, according to another embodiment.

FIG. 14 is a diagram for describing a system 1400 for connecting one from among a plurality of AP devices on a same network to a terminal, according to another embodiment.

Referring to FIG. 14, the system 1400 (referred to hereinafter as a system 1400 for connecting an AP device to a terminal) may include a plurality of AP device 1410 and 1420, a terminal 1430, and a server 1440.

FIG. 14 shows only components of the system 1400 for connecting an AP device to a terminal that are related to the present embodiment. Therefore, it would be obvious to one of ordinary skill in the art that the system 1400 for connecting an AP device to a terminal may further include general-purpose components other than the components shown in FIG. 14.

Referring to FIG. 14, the server 1440 may communicate with the plurality of plurality of AP devices 1410 and 1420 and the terminal 1430. Here, the plurality of AP devices 1410 and 1420 and the terminal 1430 may exist on a same network. As described above, a same wireless network may include wireless networks having a same SSID.

The server 1440 according to an embodiment may include identification information regarding at least one terminal and information regarding an AP device that may correspond to the at least one terminal. For example, the server 1440 may include the MAC address information regarding the terminal 1430 and information regarding the first AP device 1410 as an AP device that may correspond to the terminal 1430. Here, the AP device that may correspond to the terminal 1430 may include an AP device that may be connected to the terminal 1430. An AP device that may be connected to the terminal 1430 may be pre-set by a user based on security and communication convenience.

Meanwhile, the server 1440 may obtain identification information regarding at least one terminal and information regarding an AP device that may correspond to the at least one terminal from an external device. Furthermore, the server 1440 may obtain identification information regarding the terminal 1430 and information regarding an AP device that may correspond to the terminal 1430 from the terminal 1430. Detailed descriptions thereof will be given below with reference to FIG. 17. Furthermore, according to another embodiment, the server 1440 may obtain identification information regarding at least one terminal and information regarding an AP device that may correspond to the at least one terminal from each of the at least one terminal.

The server 1440 may transmit information regarding corresponding terminals to the plurality of AP devices 1410 and 1420, respectively. For example, the server 1440 may transmit the MAC address information regarding a first terminal to the first AP device 1410 that may correspond to the first terminal. Furthermore, the server 1440 may transmit the MAC address information regarding a second terminal to the second AP device 1420 that may correspond to the second terminal.

Each of the plurality of AP devices 1410 and 1420 may determine whether to connect the terminal 1430 thereto based on identification information regarding at least one terminal obtained from the server 1440. For example, the MAC address information regarding the terminal 1430 may be registered to the first AP device 1410, whereas the MAC address information regarding the terminal 1430 may not be registered to the second AP device 1420. In this case, if the first AP device 1410 receives connection request from the terminal 1430, since the MAC address information regarding the terminal 1430 is registered to the first AP device 1410, the first AP device 1410 may establish a connection.

On the contrary, if the second AP device 1420 receives connection request from the terminal 1430, since the MAC address information regarding the terminal 1430 is not registered to the second AP device 1420, the second AP device 1420 may not establish a connection.

The terminal 1430 may communicate with the server 1440. Furthermore, the terminal 1430 may transmit connection requests to the AP devices 1410 and 1420 existing within a certain distance. Meanwhile, the terminal 1430 according to an embodiment may be a mobile phone, a smart phone, a laptop computer, or a tablet PC, but is not limited thereto.

Figure 15:
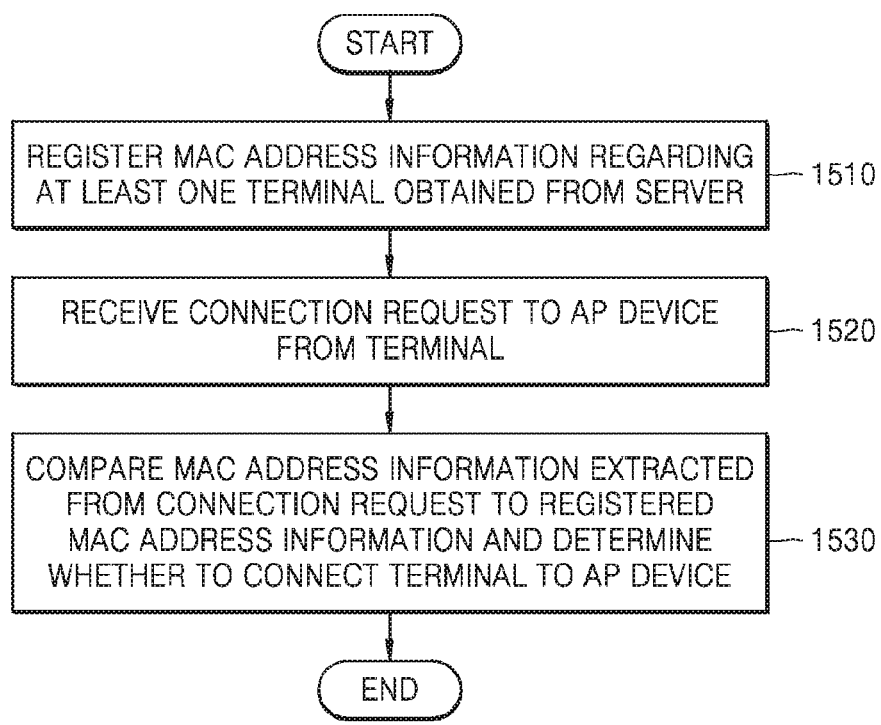
FIG. 15 is a flowchart for describing a method by which an AP device determines whether to communicate with a terminal based on information obtained from a server, according to an embodiment.

FIG. 15 is a flowchart for describing a method by which an AP device (e.g., the first AP device 1410) determines whether to communicate with the terminal 1430 based on information obtained from a server, according to an embodiment. In operation 1510, the AP device (e.g., the first AP device 1410) may obtain MAC address information regarding at least one terminal registered to the AP device 1410 from the server 1440. Here, an AP device that may correspond to the terminal 1430 may include an AP device that may be connected to the terminal 1430. An AP device that may be connected to the terminal 1430 may be pre-set by a user based on security and communication convenience. In operation 1520, the AP device receives a connection request of the terminal. Here, the connection request may include MAC address information regarding the terminal.

Meanwhile, if a plurality of AP devices exist on a same network, a terminal may transmit a connection request to an AP device that transmitted the strongest signal to the terminal. Therefore, the AP device may receive connection requests from terminals other than the terminal registered in the operation 1510. In operation 1530, the AP device may compare the MAC address information regarding the terminal extracted from the connection request received in the operation 1520 to the MAC address information registered in the operation 1510 and determine whether to connect the terminal to the AP device. If the MAC address information regarding the terminal extracted from the connection request is identical to any one of the obtained MAC address information regarding the at least one terminal, the AP device may establish a connection to the terminal.

According to the method of connecting an AP device to a terminal according to an embodiment, it is only determined to establish connections to terminals having same MAC address information as registered MAC address information on a same network, thereby limiting terminals to be connected to the AP device.

Furthermore, according to another embodiment, based on at least one MAC address information registered to a certain AP device, data may be transmitted to terminals having the respective MAC address information. The method of transmitting data to terminals having MAC address information registered to the AP device may correspond to the operation 230 described above with reference to FIG. 2.

Figure 16:
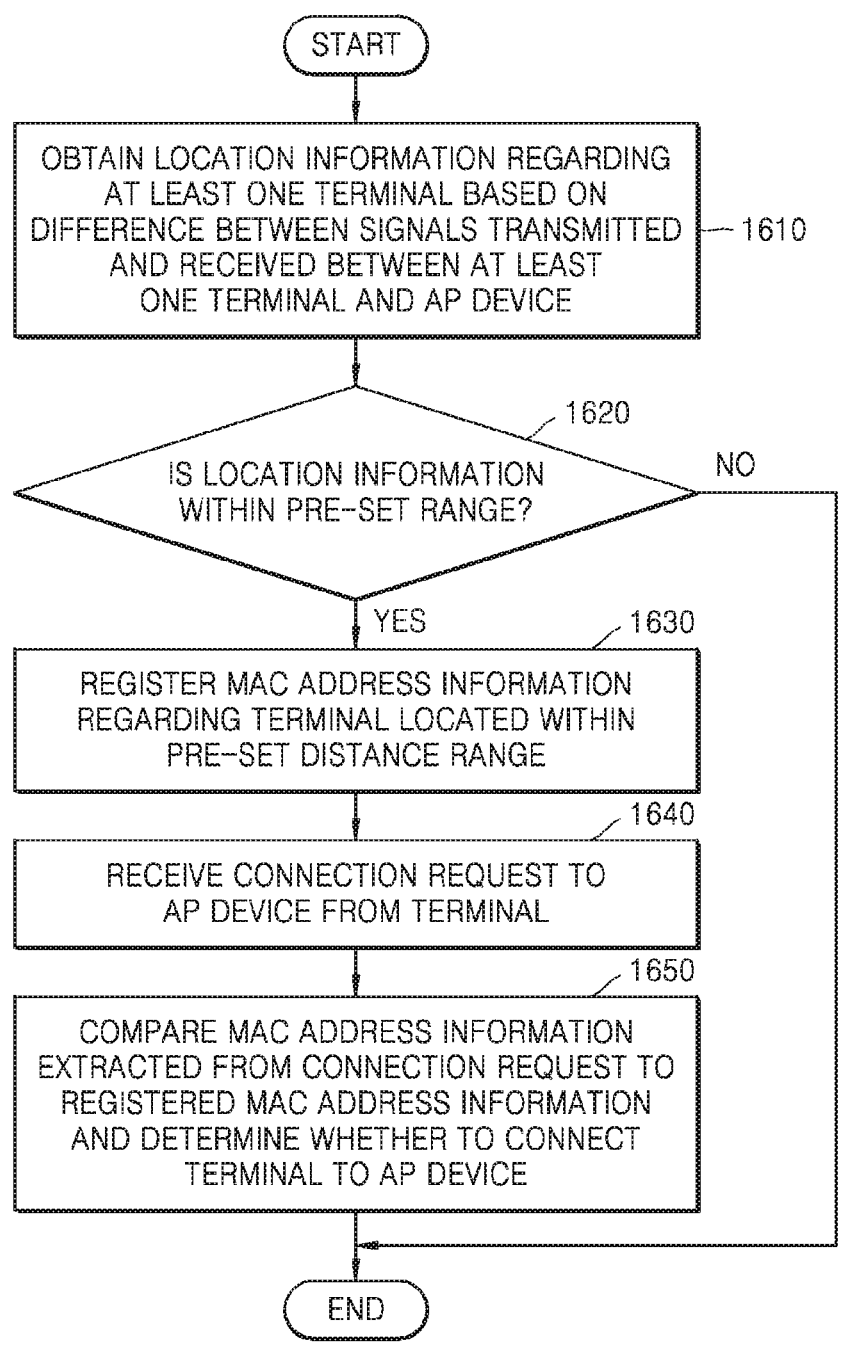
FIG. 16 is a flowchart for describing a method by which an AP device determines whether to connect a terminal to the AP device based on location information regarding at least one terminal, according to an embodiment.

FIG. 16 is a flowchart for describing a method by which an AP device determines whether to connect a terminal to the AP device based on location information regarding at least one terminal, according to an embodiment. In operation 1610, the AP device 1410 may obtain location information regarding at least one terminal from the server 1440. The AP device 1410 may obtain location information regarding each of the at least one terminal based on GPS information regarding each of the at least one terminal.

Meanwhile, according to another embodiment, the first AP device 1410 may obtain location information regarding at least one terminal based on information regarding time period elapsed for exchanging a signal with the at least one terminal and information regarding speed of the signal. However, it is merely an embodiment of the inventive concept, and methods by which an AP device obtains location information regarding at least one terminal are not limited thereto. In operation 1620, the AP device 1410 may determine whether each of the at least one terminal is located within a pre-set distance range from the AP device 1410 based on the obtained location information regarding the at least one terminal. Here, the pre-set distance range may be set by a user or determined based on the location of the AP device 1410. In operation 1630, the AP device 1410 may register MAC address information regarding a terminal located within the pre-set distance range. The AP device 1410 may register MAC address information regarding a terminal existing within the pre-set distance range based on the obtained location information regarding the at least one terminal. For example, as a result of a determination based on obtained location information regarding a first terminal and a second terminal, the AP device 1410 may register the MAC address information regarding the first terminal located within the pre-set distance range. In operation 1640, the AP device 1410 may receive a connection request to the AP device 1410 from a terminal. Here, the connection request may include MAC address information regarding the corresponding terminal. For example, the AP device 1410 may receive a connection request from the first terminal, where the connection request from the first terminal may include the MAC address information regarding the first terminal.

Meanwhile, if a plurality of AP devices exist on a same network, a terminal may transmit a connection request to an AP device that transmitted the strongest signal to the terminal. Therefore, an AP device may receive connection requests from terminals other than a registered terminal. In operation 1650, the AP device may compare the MAC address information regarding the corresponding terminal extracted from the connection request to registered MAC address information and determine whether to connect the corresponding terminal to the AP device. If the MAC address information regarding the terminal extracted from the connection request is identical to any one of the obtained MAC address information regarding the at least one terminal, the AP device may establish a connection to the terminal.

Figure 17:
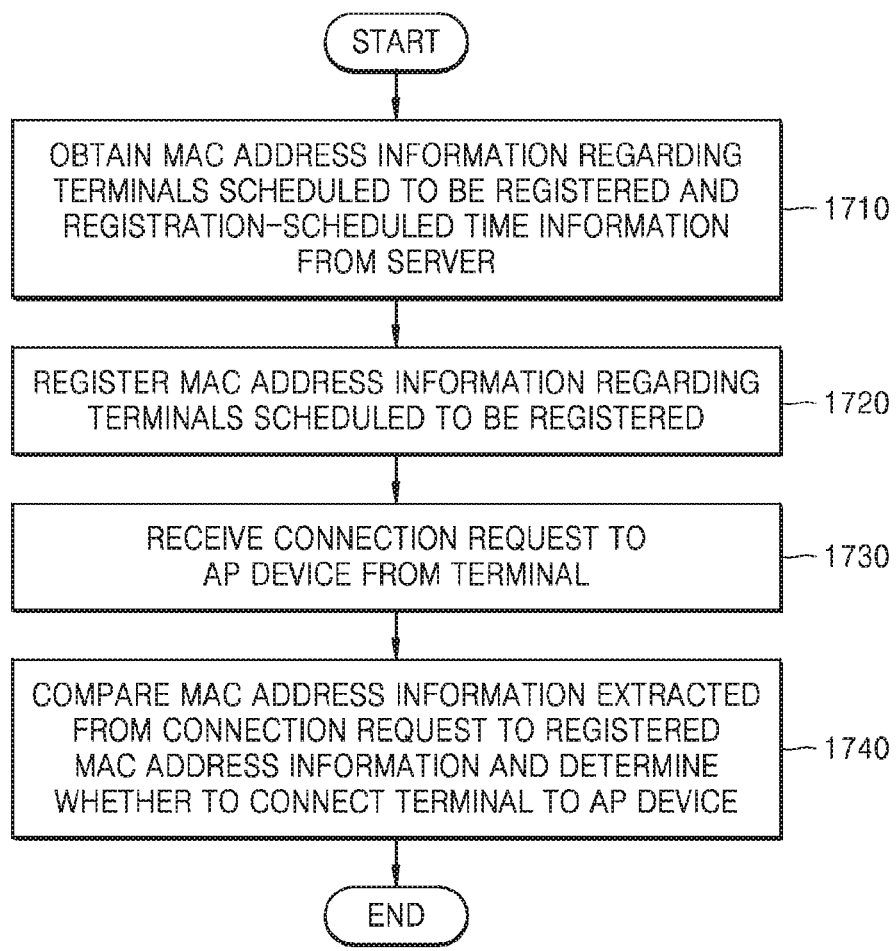
FIG. 17 is a flowchart for describing a method by which an AP device determines whether to connect a terminal thereto based on time information, according to another embodiment.

FIG. 17 is a flowchart for describing a method by which the AP device 1410 determines whether to connect a terminal thereto based on time information, according to another embodiment. In operation 1710, the AP device 1410 may obtain MAC address information and registration-scheduled time information regarding terminals scheduled to be registered from the server 1440. Here, the terminals scheduled to be registered may include terminals that are scheduled for registration of MAC address information thereof to the first AP device 1410 at pre-set time points.

For example, the server 1440 may include the MAC address information regarding a first terminal, which is one of terminals scheduled to be registered, and registration-scheduled time information indicating that the first terminal will be located at a first conference room corresponding to the AP device 1410 at 10 AM. Furthermore, the server 1440 may include the MAC address information regarding a second terminal, which is another one of the terminals scheduled to be registered, and registration-scheduled time information indicating that the second terminal will be located at the first conference room corresponding to the AP device 1410 at 1 PM. In operation 1720, the AP device 1410 may register the MAC address information regarding the terminals (the first terminal and the second terminal) at the registration-scheduled time points. For example, the AP device 1410 may register the MAC address information regarding the first terminal at 10 AM and register the MAC address information regarding the second terminal at 1 PM. In operation 1730, the AP device receives a connection request from a terminal. Here, the connection request may include the MAC address information regarding the corresponding terminal. For example, the AP device may receive a connection request from the first terminal, where the connection request from the first terminal may include the MAC address information regarding the first terminal. In operation 1740, the AP device may compare the MAC address information regarding the terminal extracted from the connection request to MAC address information registered at respective time points and determine whether to connect the terminal to the AP device. If the MAC address information regarding the terminal extracted from the connection request is identical to any one of the obtained MAC address information regarding the at least one terminal, the AP device may establish a connection to the terminal.

Figure 18:
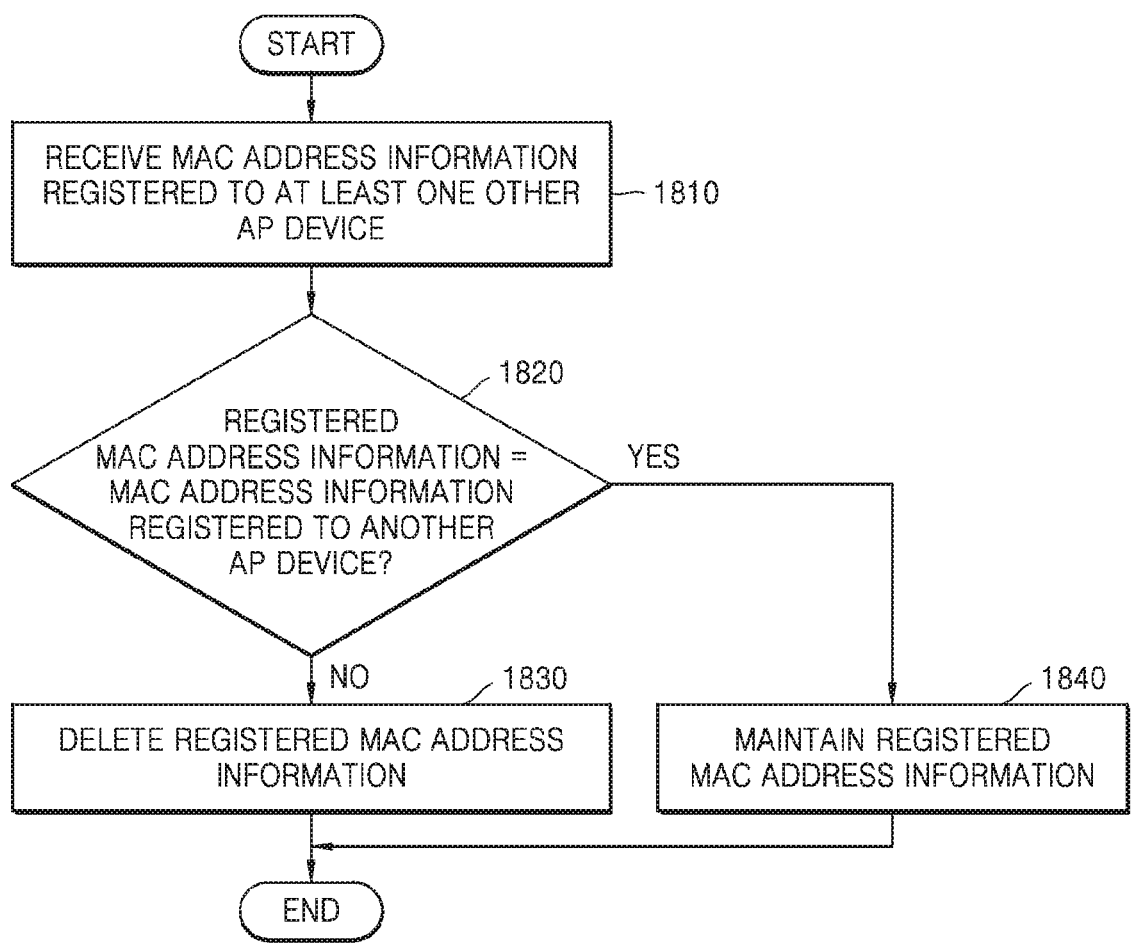
FIG. 18 is a flowchart showing a method by which an AP device terminates a connection to a terminal, according to an embodiment.

FIG. 18 is a flowchart showing a method by which an AP device terminates a connection to a terminal, according to an embodiment. In operation 1810, the AP device may receive MAC address information regarding at least one terminal registered to another AP device on a same network from a server. According to an embodiment, the server may manage MAC address information regarding terminals registered to at least one or more AP devices existing on a same network. For example, when MAC address information regarding a terminal is registered to an AP device, the AP device may transmit the registered MAC address information to the server. Furthermore, the server may collect registered MAC address information received from respective AP devices and transmit the collected MAC address information to the respective AP devices. Each of the AP devices may check MAC address information regarding terminals registered to other AP devices existing on a same network by using information received from the server.

Meanwhile, an AP device may receive MAC address information regarding terminals registered to another AP device from the server every time MAC address information regarding a new terminal is registered to the AP device. The AP device may receive MAC address information regarding terminals registered to another AP device from the server at a pre-set time interval. In operation 1820, the AP device may compare MAC address information registered by using information received from the server in the operation 1810 to MAC address information registered to another AP device on a same network. In operation 1830, the AP device deletes registered MAC address information. If it is determined as a result of the comparison in the operation 1820 that the time point at which the MAC address information is registered to the AP device is earlier than the time point at which the MAC address information is registered to the second AP device, the MAC address information registered to the AP device may be deleted. In operation 1840, the AP device deletes MAC address information registered to the second AP device. For example, the AP device may transmit a deletion request signal to the second AP device to delete MAC address information registered to the second AP device. Furthermore, the deletion request signal may be transmitted from the AP device to the second AP device via the server.

If same MAC address information is registered to the second AP device, it may be considered that a user wants to register the correspond MAC address information to a current AP device to switch an AP device to connect. Therefore, the MAC address information registered to the second AP device may be deleted.

On the other hand, according to an embodiment, various methods of managing registered MAC address information may be employed other than the method of managing registered MAC address information based on MAC address information received from a server.

For example, registered MAC address information may be deleted at a pre-set time interval. In detail, if a time period that MAC address information is being registered to an AP device exceeds a pre-set time period, the corresponding registered MAC address information may be automatically deleted. A time period that MAC address information is being registered may be determined based on connection time information regarding a corresponding terminal. Here, the connection time information indicates a time point at which the terminal transmitted the MAC address information thereof to the AP device via an external device.

Figure 19:
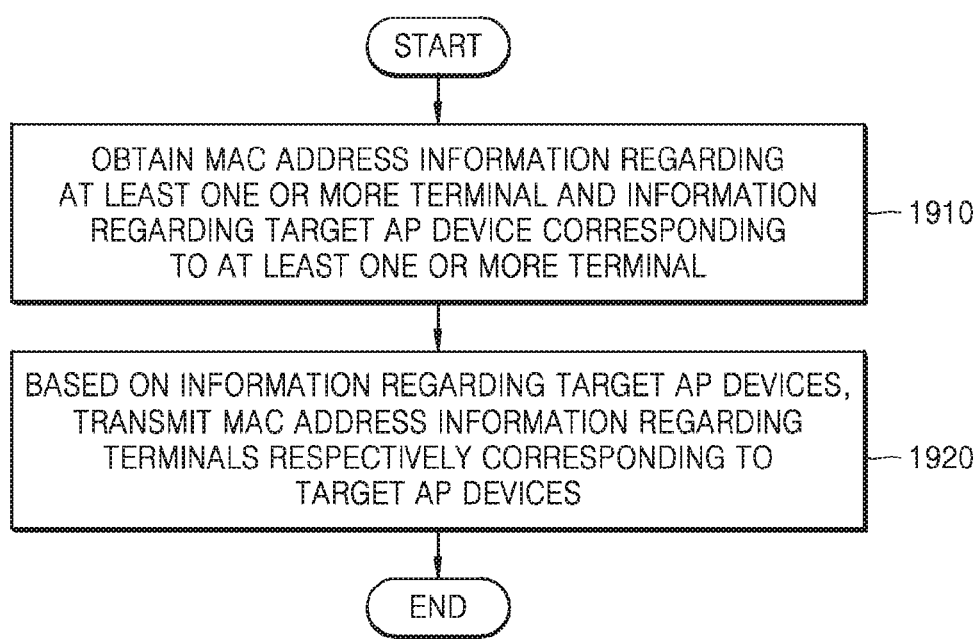
FIG. 19 is a flowchart for describing a method by which a server included in a system for connecting one from among a plurality of AP devices to a terminal connects an AP device to a terminal, according to another embodiment.

FIG. 19 is a flowchart for describing a method by which the server 1440 included in a system for connecting one from among a plurality of AP devices to a terminal connects an AP device to a terminal, according to another embodiment. In operation 1910, the server 1440 obtains identification information regarding at least one terminal and information regarding an AP device corresponding to the at least one terminal. The server 1440 according to an embodiment may obtain identification information regarding at least one terminal and information regarding an AP device corresponding to the at least one terminal from the respective terminals.

For example, a user may access an application for reserving a lecture room and input a lecture room to reserve and a reservation time. Information regarding the lecture room and information regarding the reservation time input by the user via the application executed on a terminal and identification information regarding the terminal may be transmitted to the server 1440 together. Based on the received information, the server 1440 may match the identification information regarding the terminal to an AP device located at the lecture room to be reserved and the information regarding the reservation time and store the matched information. However, the above-stated application for reserving a lecture room is merely an embodiment of the inventive concept, and a user may transmit identification information regarding a terminal and information regarding an AP device corresponding to the terminal to the server 1440 via various applications that may access both the terminal and the server 1440.

According to another embodiment, the server 1440 may obtain identification information regarding at least one terminal that may be connected to AP devices and information regarding AP devices corresponding to the at least one terminal from an external device that manages AP devices. In operation 1920, the server 1440 transmits MAC address information regarding the at least one terminal to respective corresponding AP devices based on information regarding the AP devices corresponding to the at least one terminal. For example, the server 1440 may transmit the MAC address information regarding a first terminal to a first AP device corresponding to the first terminal. Furthermore, according to another embodiment, the server 1440 may transmit the MAC address information regarding the first terminal and time information indicating a time point to register the MAC address information regarding the first terminal to the first AP device to the first AP device corresponding to the first terminal.

Meanwhile, since MAC address information regarding a terminal is merely one of various identification information regarding the terminal, and thus various other identification information for identifying the terminal other than MAC address information may be used. For example, information regarding an ID of a user of the terminal may be used as information for identifying the terminal. Based on information regarding a terminal corresponding to an AP device according to an embodiment, if a connection request is received from the terminal, the AP device may determine whether to connect the terminal to the AP device.

Figure 20:
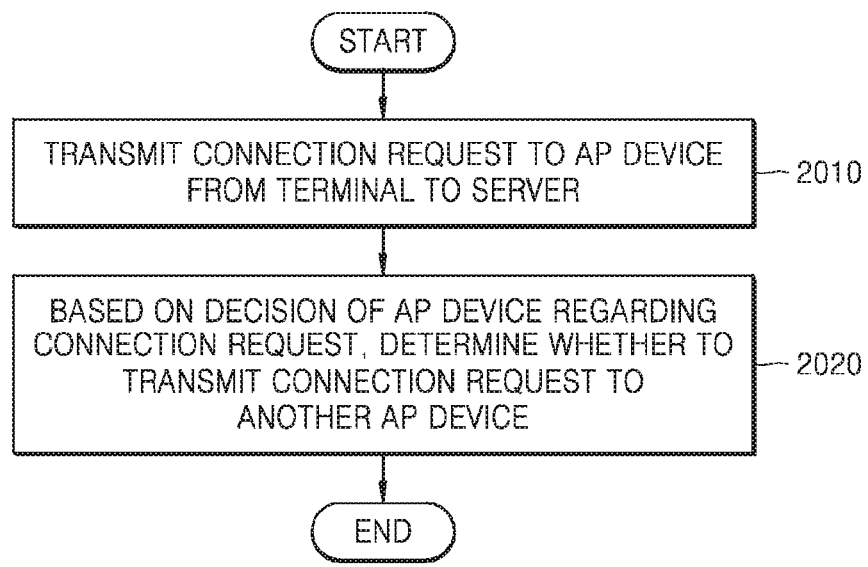
FIG. 20 is a flowchart for describing a method by which a terminal included in a system for connecting one of a plurality of AP devices to a terminal establishes a connection to an AP device, according to another embodiment.

FIG. 20 is a flowchart for describing a method by which the terminal 1430 included in a system for connecting one of a plurality of AP devices to a terminal establishes a connection to an AP device, according to another embodiment. In operation 2010, the terminal 1430 transmits a connection request with respect to one of a plurality of AP devices. If a plurality of AP devices exist on a same network, the terminal may transmit a connection request to an AP device that transmitted the strongest signal to the terminal. In operation 2020, the AP device may determine whether to transmit a connection request to another AP device based on a decision of the AP device regarding the connection request transmitted in the operation 2010.

In detail, the AP device may compare MAC address information regarding the terminal extracted from the connection request to MAC address information registered to the AP device in advance and determine whether to connect the terminal to the AP device. According to an embodiment, the AP device may register MAC address information regarding at least one terminal received from the server 1440.

Figure 21:
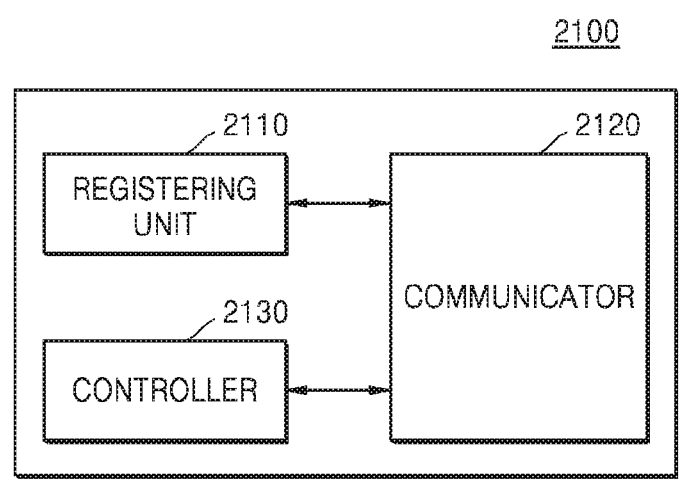
FIG. 21 is a block diagram showing an AP device that establishes a connection to a terminal, according to another embodiment.

FIG. 21 is a block diagram showing an AP device 2100 that establishes a connection to a terminal, according to another embodiment.

Referring to FIG. 21, the AP device 2100 according to an embodiment may include a registerer 2110, a communicator 2120, and a controller 2130. Here, the AP device 2100 performs the same functions as those of the plurality of AP devices 1410 and 1420 shown in FIG. 14.

FIG. 21 shows only components of the AP device 2100 that are related to the present embodiment. Therefore, it would be obvious to one of ordinary skill in the art that the AP device 2100 may further include general-purpose components other than the components shown in FIG. 21.

The registerer 2110 may register identification information regarding at least one terminal. According to an embodiment, the AP device 2100 may register MAC address information regarding at least one terminal received from the terminal 1430. Here, the AP device is one of a plurality of AP devices existing on a same network.

The communicator 2120 may receive identification information regarding at least one terminal corresponding to the AP device 2100 from the terminal 1430. For example, the communicator 2120 may receive MAC address information regarding at least one terminal corresponding to the AP device 2100 from the terminal 1430. Furthermore, the communicator 2120 may receive MAC address information regarding at least one terminal corresponding to the AP device 2100 and time information indicating a time point to register the MAC address information regarding the at least one terminal from the terminal 1430.

The communicator 2120 may receive a connection request to the AP device 2100 from at least one terminal. According to an embodiment, the connection request may include the MAC address information regarding the corresponding terminal.

The controller 2130 may compare the MAC address information regarding the terminal extracted from the connection request to registered MAC address information and determine whether to connect the terminal to the AP device.

In detail, the controller 2130 may extract MAC address information regarding the terminal from the received connection request. The controller 2130 may identify the terminal by using the extracted MAC address information regarding the terminal. The controller 2130 may compare the extracted MAC address information regarding the terminal to registered MAC address information. The controller 2130 may determine whether to connect the terminal to the AP device based on whether the MAC address information regarding the terminal is identical to registered MAC address information.

For example, if the MAC address information regarding the terminal is identical to MAC address information registered to the AP device, the controller 2130 may connect the terminal to the AP device. When the terminal is connected to the AP device, the controller 2130 may transmit a connection completion message to the terminal, thereby providing information indicating that the terminal is connected to the AP device.

Furthermore, if the MAC address information regarding the terminal is not identical to MAC address information registered to the AP device, the controller 2130 may not connect the terminal to the AP device. When the terminal is not connected to the AP device, the controller 2130 may transmit a connection failure message to the terminal, thereby providing information indicating that the terminal is not connected to the AP device Meanwhile, the controller 2130 may compare MAC address information registered by using information received by the communicator 2120 from a server to MAC address information registered to a second AP device on a same network. If it is determined as a result of the comparison that MAC address information identical to MAC address information registered to the second AP device is registered, only one of the AP devices may be selected as an AP device with valid registration. For example, if the time point at which the MAC address information is registered to a first AP device is earlier than the time point at which the MAC address information is registered to a second AP device, it may be determined that the registration to the second AP device is more valid.

If registered MAC address information is determined as being identical to MAC address information registered to a second AP device, the controller 2130 may transmit a deletion request signal to a terminal to delete the MAC address information registered to the second AP device. Furthermore, if registered MAC address information is determined as not being identical to MAC address information registered to a second AP device, the controller 2130 may maintain the registered MAC address information without performing any further operation.

On the other hand, according to an embodiment, various methods of managing registered MAC address information may be employed other than the method of managing registered MAC address information based on MAC address information received from a server.

For example, the controller 2130 may delete registered MAC address information at a pre-set time interval. In detail, if a time period that MAC address information is being registered to an AP device exceeds a pre-set time period, the corresponding registered MAC address information may be automatically deleted. A time period that MAC address information is being registered may be determined based on connection time information regarding a corresponding terminal. Here, the connection time information indicates a time point at which the terminal transmitted the MAC address information thereof to the AP device via an external device.

Furthermore, the controller 2130 may determine a time period elapsed after an external device recognized a terminal. If a time period elapsed after the external device recognized the terminal exceeds a pre-set time interval, the MAC address information regarding the corresponding terminal registered to an AP device may be deleted.

Additionally, the controller 2130 may delete MAC address information registered to all AP devices on a same network at once at a particular time point.

According to another embodiment, if MAC address information regarding a terminal is already registered to an AP device, a user may delete the registered MAC address information regarding the terminal by authenticating the MAC address information regarding the same terminal to the same AP device once again. If the AP device is connected to the terminal, the user may terminate the connection between the AP device and the terminal by transmitting the MAC address information regarding the same terminal to the AP device by using an external device once again. The controller 2130 may compare MAC address information registered to the AP device to newly-input MAC address information and confirm that the MAC address information regarding the same terminal is input once again.

Figure 22:
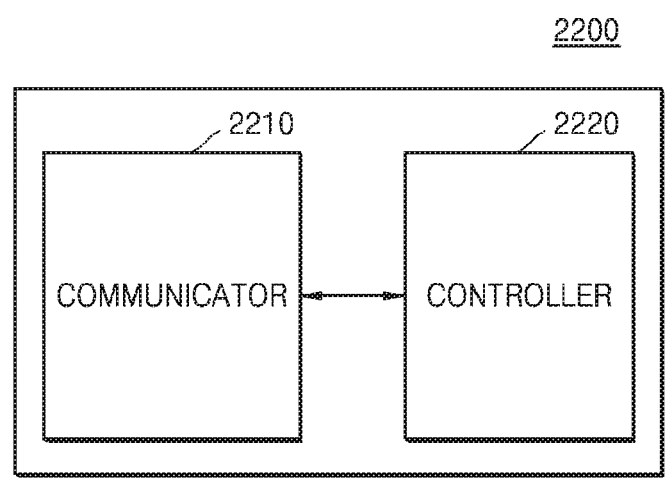
FIG. 22 is a block diagram showing a server included in a system for connecting one from among a plurality of AP devices on a same network to a terminal, according to another embodiment.

FIG. 22 is a block diagram showing a server 2200 included in the system 1400 for connecting one from among a plurality of AP devices on a same network to a terminal, according to another embodiment. The server 2200 may correspond to the server 1440 described above with reference to FIG. 14.

Referring to FIG. 22, the server 2200 according to an embodiment may include a communicator 2210 and a controller 2220.

FIG. 22 shows only components of the server 2200 that are related to the present embodiment. Therefore, it would be obvious to one of ordinary skill in the art that the server 2200 may further include general-purpose components other than the components shown in FIG. 22.

The communicator 2210 obtains identification information regarding at least one terminal and information regarding an AP device that may correspond to the at least one terminal from an external device. The communicator 2210 according to an embodiment may obtain identification information regarding at least one terminal and information regarding an AP device that may correspond to the at least one terminal from each of the at least one terminal.

According to another embodiment, the communicator 2210 may obtain identification information regarding at least one terminal that may be connected to AP devices and information regarding AP devices corresponding to the at least one terminal from an external device that manages AP devices.

Based on the obtained identification information regarding the at least one terminal that may be connected to AP devices and the information regarding AP devices corresponding to the at least one terminal, the communicator 2210 may match the at least one terminal to an AP device and store a matched result. Furthermore, the communicator 2210 may categorize MAC address information regarding at least one terminal, information regarding AP devices corresponding to the at least one terminal, and registration-scheduled time information regarding terminals scheduled to be registered to an AP device according to AP devices.

Meanwhile, based on the information regarding AP devices corresponding to the at least one terminal, the communicator 2210 transmits MAC address information regarding the at least one terminal to the respective AP devices corresponding to the at least one terminal. For example, the server 1440 may transmit the MAC address information regarding a first terminal to a first AP device corresponding to the first terminal. Furthermore, according to another embodiment, the server 1440 may transmit the MAC address information regarding the first terminal and time information indicating a time point to register the MAC address information regarding the first terminal to the first AP device to the first AP device corresponding to the first terminal.

Meanwhile, since MAC address information regarding a terminal is merely one of various identification information regarding the terminal, and thus various other identification information for identifying the terminal other than MAC address information may be used. For example, information regarding an ID of a user of the terminal may be used as information for identifying the terminal. Based on information regarding a terminal corresponding to an AP device received from the server 1440, if a connection request is received from the terminal, the AP device may determine whether to connect the terminal, which transmitted the connection request, to the AP device.

Figure 23:
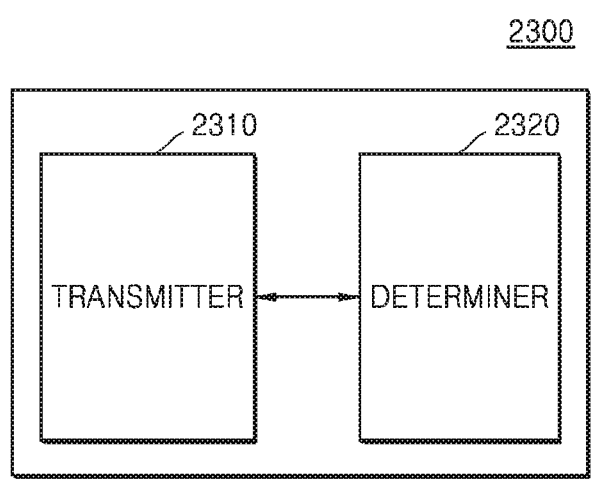
FIG. 23 is a block diagram showing a terminal that establishes a connection to an AP device, according to an embodiment.

FIG. 23 is a block diagram showing a terminal 2300 that establishes a connection to an AP device, according to an embodiment. The terminal 2300 may correspond to the terminal 1430 described above with reference to FIG. 14.

Referring to FIG. 23, the terminal 2300 according to an embodiment may include a transmitter 2310 and a determiner 2320.

FIG. 23 shows only components of the terminal 2300 that are related to the present embodiment. Therefore, it would be obvious to one of ordinary skill in the art that the terminal 2300 may further include general-purpose components other than the components shown in FIG. 23.

The transmitter 2310 may transmit a connection request to an AP device. If a plurality of AP devices exist on a same network, the terminal 2300 may transmit a connection request to an AP device that transmitted the strongest signal to the terminal. Here, the connection request may include MAC address information regarding the terminal.

The determiner 2320 may determine whether to transmit a connection request to a second AP device based on a decision of the AP device regarding the connection request. If the AP device determined to connect the terminal 2300 to the AP device, the determiner 2320 may not transmit a connection request to the second AP device. However, if the AP device determined not to connect the terminal 2300 to the AP device, the determiner 2320 may transmit a connection request to the second AP device.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to one of ordinary skill in the art without departing from the spirit and scope of the present invention.

The invention claimed is:

1. A method for controlling an access point (AP) device, the method comprising:
   receiving media access control (MAC) address information of a terminal from the terminal through an external device;
   registering the received MAC address information;
   determining whether the registered MAC address information corresponding to MAC address information registered to another AP device;
   in response to the registered MAC address information corresponding to the MAC address information registered to the other AP device, determining an AP device managing the registered MAC address information among the AP device and the other AP device;
   receiving a connection request from the terminal;
   connect the terminal to the AP device based on whether MAC address information of the connection request is corresponding to the registered MAC address information.

2. The method of claim 1, wherein, in the connecting, if the registered MAC address information is corresponding to the MAC address information of the connection request, the terminal is connected to the AP device, and,
   if the registered MAC address information is not corresponding to the MAC address information of the connection request, the terminal is not connected to the AP device.

3. The method of claim 1, wherein the registering, by the AP device, of the received MAC address information comprises:
   receiving, from a server, registration-schedule information comprising information about pre-set time points at which the terminal to be registered with the AP device;
   determining whether the received MAC address information is within a time from among the pre-set time points, corresponding to the terminal based on the registration-schedule information; and
   in response to the determining that the received MAC address information is within the pre-set time points, storing the MAC address information as registered terminal; and
   in response to the determining that the received MAC address information is outside of the pre-set time points, discarding the MAC address information.

4. The method of claim 1, wherein the registering of the received MAC address information comprises:
   in response to the receiving of the MAC address information from the external device, storing the received MAC address information and wherein the terminal is not connected to a network provided by the AP device prior to the first connection request.

5. The method of claim 1, wherein the MAC address information regarding the terminal is received through the external device by using at least one of a radio frequency identification (RFID) and an near field communication (NFC) with the one or more terminals.

6. The method of claim 1, wherein the MAC address information regarding the terminal is received through the external device by using a quick response (QR) code.

7. The method of claim 1, further comprising deleting the registered MAC address information at a pre-set time interval.

8. The method of claim 2, further comprising:
if MAC address information corresponding to the registered MAC address information is received once again in another connection request while the terminal is connected to the AP device, deleting the registered MAC address information regarding the terminal.

9. A method for controlling a terminal, the method comprising:
transmitting a connection request to an access point (AP) device; and
determining whether to transmit a connection request to another AP device based on a decision of the AP device regarding the connection request,
wherein whether to connect the terminal to the AP device is determined based on whether the MAC address information of the connection request is corresponding to MAC address information registered in advance in the AP device, is determined at the AP device,
wherein the MAC address information registered in advance is provided from the terminal through an external device to the AP device prior to the connection request, and
wherein, in response to the registered MAC address information corresponding to MAC address information registered to the other AP device, an AP device managing the registered MAC address information is determined among the AP device and the other device.

10. The method of claim 9, wherein if the terminal is not connected to the AP device, the connection request is transmitted to the other AP device.

11. An AP device that establishes a connection with a terminal, the AP device comprising:
a transceiver; and
at least one processor configured to:
control the transceiver to receive media access control (MAC) address information of a terminal from the terminal through an external device,
register the received MAC address information,
determine whether the registered MAC address information corresponding to MAC address information registered to another AP device,
in response to the registered MAC address information corresponding to the MAC address information registered to the other AP device, determine an AP device managing the registered MAC address information among the AP device and the other AP device,
control the transceiver to receive a connection request from the terminal, and
connect the terminal to the AP device based on whether MAC address information of the connection request is corresponding to the registered MAC address information.

12. The AP device of claim 11, wherein if the registered MAC address information is corresponding to the MAC address information of the connection request, the terminal is connected to the AP device, and
if the registered MAC address information is not corresponding to the MAC address information of the connection request, the terminal is not connected to the AP device.

13. The AP device of claim 11, wherein the processor configured to:
control the transceiver to receive, from a server, registration-schedule information comprising information about pre-set time points at which the terminal to be registered with the AP device,
determine whether the received MAC address information is within a time from among the pre-set time points, corresponding to the terminal based on the registration-schedule information,
in response to the determining that the received MAC address information is within the pre-set time points, store the MAC address information as registered terminal, and
in response to the determining that the received MAC address information is outside of the pre-set time points discard the MAC address information.

14. The AP device of claim 11, wherein the registering of the received MAC address information comprises, in response to the receiving of the MAC address information from the external device, storing the received MAC address information and
wherein the terminal is not connected to a network provided prior to the first connection request.

15. The AP device of claim 11, wherein the MAC address information regarding the terminal is received through the external device by using at least one of a radio frequency identification (RFID) and an near field communication (NFC) with the one or more terminals.

16. The AP device of claim 11, wherein the MAC address information regarding the terminal is received through the external device by using a quick response (QR) code.

17. The AP device of claim 11, wherein the at least one processor configured to delete the registered MAC address information at a pre-set time interval.

18. The AP device of claim 12, wherein the at least one processor configured delete the registered MAC address information regarding the terminal, if MAC address information corresponding to the registered MAC address information is received once again in another connection request while the terminal is connected to the AP device.

19. A terminal that establishes a connection with a AP device, the terminal comprising:
transceiver; and
at least one processor configured to:
control the transceiver to transmit a connection request to an access point (AP) device, and
determine whether to transmit a connection request to another AP device based on a decision of the AP device regarding the connection request,
wherein whether to connect the terminal to the AP device is determined based on whether the MAC address information of the connection request is corresponding to MAC address information registered in advance in the AP device, is determined at the AP device,
wherein the MAC address information registered in advance is provided from the terminal through an external device to the AP device prior to the connection request, and wherein, in response to the registered MAC address information corresponding to MAC address information registered to the other AP device, an AP device managing the registered MAC address information is determined among the AP device and the other device.

20. The terminal of claim 19, wherein if the terminal is not connected to the AP device, the connection request is transmitted to the other AP device.

* * * * *